United States Patent [19]
Saito et al.

[11] Patent Number: 5,077,341
[45] Date of Patent: Dec. 31, 1991

[54] PROCESS FOR PRODUCING A HIGH-STIFFNESS POLYPROPYLENE AND A HIGHLY STEREOREGULAR POLYPROPYLENE

[75] Inventors: Jun Saito, Sodegauramachi; Akihiko Sanpei, Chibashi, both of Japan

[73] Assignee: Chisso Corporation, Osaka, Japan

[21] Appl. No.: 536,711

[22] Filed: Jun. 12, 1990

[30] Foreign Application Priority Data

Jun. 19, 1989 [JP] Japan .................. 10-156042
Sep. 26, 1989 [JP] Japan .................. 1-249439

[51] Int. Cl.$^5$ .................. C08F 297/08; C08F 110/06
[52] U.S. Cl. .................. 525/270; 525/247; 525/297; 525/321; 525/323
[58] Field of Search .................. 525/270, 297, 323

[56] References Cited

U.S. PATENT DOCUMENTS

| | | | |
|---|---|---|---|
| 4,210,729 | 7/1980 | Hermans et al. | 525/247 |
| 4,210,738 | 7/1980 | Hermans et al. | 526/152 |
| 4,526,931 | 7/1985 | Chiba et al. | 525/323 |
| 4,543,389 | 9/1985 | Burstain et al. | 525/323 |
| 4,547,552 | 10/1985 | Toyota et al. | 525/323 |
| 4,550,144 | 10/1985 | Chiba et al. | 525/323 |
| 4,551,501 | 11/1985 | Shiga et al. | 525/88 |
| 4,582,878 | 4/1986 | Chiba et al. | 525/323 |
| 4,603,174 | 7/1986 | Okada et al. | 525/240 |
| 4,748,207 | 5/1988 | Kakugo et al. | 525/88 |
| 4,978,722 | 12/1990 | Goko et al. | 525/323 |

FOREIGN PATENT DOCUMENTS 62-275111 11/1987 Japan .
63-069809 3/1988 Japan .
62-218709 9/1988 Japan .
2114581 8/1983 United Kingdom .

*Primary Examiner*—Carman J. Seccuro
*Attorney, Agent, or Firm*—Fred Philpitt

[57] ABSTRACT

A process for producing a highly transparent and highly stiff polypropylene affording a superior molded product is provided, which process comprises using a catalyst obtained by combining ① a titanium trichloride composition (III) obtained by reacting TiCl$_4$ with an organoaluminum compound (A$_1$) or a reaction product (I) or (A$_1$) with an electron donor (B$_1$) to obtain a solid product (II), followed by subjecting the product (II) to a multi-stage polymerization treatment with a linear olefin and a non-linear olefin, each once or more times used, and further reacting the resulting linear olefin-non-linear olefin block copolymer with an electron donor (B$_2$) and an electron acceptor, ② an organoaluminum compound (A$_2$); and as a third component, ③ an aromatic carboxylic acid ester (E) or an organosilicon compound (S) having a Si—O—C bond and/or a mercapto group.

10 Claims, 2 Drawing Sheets

PROCESS FOR PRODUCING A HIGH-STIFFNESS POLYPROPYLENE AND A HIGHLY STEREOREGULAR POLYPROPYLENE

BACKGROUND OF THE INVENTION

1. Field of the Invention

This invention in the first aspect relates to a process for producing a high-stiffness polypropylene. More particularly it relates to a process for producing a high-stiffness polypropylene having a far superior transparency.

Further, this invention in the second aspect relates to a highly stereospecific polypropylene. More particularly it relates to a polypropylene affording a molded product having a far superior transparency, stiffness and durability according to a conventional molding process even without adding any particular additive, and a broad molecular weight distribution and a very high stereoregularity.

2. Description of the Related Art

The inventors of Chisso Corporation have previously proposed a process for producing a high-stiffness polypropylene using a catalyst prepared by combining a titanium trichloride composition obtained according to a specified process with an organoaluminum compound an aromatic carboxylic acid ester, each in specified proportions (Japanese patent application laid-open No. Sho 58-104,907, hereinafter referred to as the prior application invention). According to the process of this prior application invention, it has become possible to produce a polypropylene affording a molded product having a far higher stiffness than that of polypropylene obtained according to conventional known processes, even without adding any particular additive.

However, while the polypropylene obtained according to the prior application invention has the above-mentioned high stiffness, it is translucent and hence in the field of its use applications, the commodity value has often been damaged so that improvement in the transparency has been desired.

On the other hand, as an attempt of improving the transparency of polypropylene or as another attempt of improving the stiffness, various processes have been proposed such as those of polymerizing propylene using a catalyst subjected to a preliminary activation treatment by polymerizinq a small quantity of a non-linear olefin such as vinylcyclohexane, p-t-butylstyrene, allyltrimethylsilane, 4,4-dimethylpentene-1, etc., or a catalyst obtained by the preliminary activation treatment with a non-linear olefin, followed by a preliminary actiuation treatment with propylene (Japanese patent application laid-open Nos. Sho 60-139,710, Sho 63-15,803, Sho 63-15,804, Sho 63-37,105, Sho 63-218,709, etc.). Thus, the present inventors have carried out polypropylene production according to these proposed processes. As a result, according to any of these processes, the polymerization activity of propylene not only lowers, but also operational problems occurred such as formation of massive polymer, adhesion of scales onto the wall of the polymerization vessel, inferior controllability of polymerization reaction, etc.; hence it was impossible to employ these processes in the case of commercial long term continuous polymerization processes, particularly in the case of gas phase polymerization process of carrying out propylene polymerization in gas phase.

Further, the stiffness of the resulting polypropylene was lower and insufficient as compared with that of polypropylene obtained according to the process of the prior application invention. Further, when the polypropylene was processed into film, a definite improvement in the transparency was observed, but a number of voids occurred in the film to damage its commodity value.

Further, as a similar technique, a process has been proposed wherein propylene is polymerized using a catalyst component obtained by adding a non-linear olefin polymer such as vinylcyclohexane polymer, allyltrimethylsilane polymer, etc., midway during the production of the transition metal component for propylene polymerization (Japanese patent application laid-open No. 63-69,809), but this proposed process requires a separate process of producing a non-linear olefin polymer so that the process has been not only accompanied with a commercial disadvantage, but also there have been raised problems of insufficient stiffness and occurrence of voids in the film as in the case of the above-mentioned prior art.

The present inventors have made extensive research on a process for producing a high-stiffness polypropylene having solved various problems of the above-mentioned prior application invention and prior art and having an improved transparency, and as a result, have found a titanium trichloride composition having a linear olefin-non-linear olefin block copolymer contained therein, and further have found that when this titanium trichloride composition is combined with specified quantities of an organoaluminum compound and further an aromatic carboxylic acid ester and polypropylene is produced using the resulting catalyst, then the problems of the above-mentioned prior art in the aspect of production and quality are dissolved and also the polypropylene has not only a far superior transparency, but also a further improved stiffness as compared with the polypropylene obtained according to the process of the prior application invention, and thus have completed the present invention in a first aspect.

As apparent from the foregoing, the object of the present invention in the first aspect is to provide a process for producing a high-stiffness polypropylene having very small occurrence of voids and a far superior transparency.

Further, the prior art related to the present invention in the second aspect and its problems will be described below.

Polypropylene are superior in the heat resistance, chemical resistance and electric properties and further are good in the stiffness, tensile strength, optical characteristics and workability; thus it has been broadly applied to injection molding, extrusion molding, blow molding, etc.

However, known conventional polypropylene has been restricted in its use applications due to the limits of physical properties and workability; hence in order to solve the above-problems, improvement in the properties of polypropylene, particularly improvements in retention of stiffness and strength at high temperatures, durability, moldability of large-size molded products, etc. have been earnestly desired.

As to the improvement in the above various properties, various attempts have been continued such as enhancing the stereoregularity of polypropylene to thereby improve physical properties such as heat resistance, stiffness, strength, etc., broadening the molecular weight distribution to thereby improve the strength and durability depending upon the high molecular weight part and thus improve the moldability at the time of extrusion molding, blow molding, etc.

The inventors of Chisso Corporation, too, have previously proposed a highly stereoregular polypropylene having a broad molecular weight distribution in Japanese patent application laid-open Nos. Sho 59-22,913 and Sho 63-191,809. By using this polypropylene, a molded product having a far higher stiffness and durability as compared with known conventional polypropylene has been obtained to thereby make it possible to broaden the fields of its definite use applications. However, while the boiling n-heptane-insolubles of the polypropylene have a high stereoregularity, the stereoregularity of the total polymer is insufficient and hence further improvement in the stereoregularity has been desired and besides, improvement in the transparency has also been desired.

Further, as to other techniques for providing polypropylene having a relatively high stereoregularity, for example the following polypropylenes have been disclosed:

polypropylene obtained by using a titanium trichloride composition as a solid catalyst component such as polypropylene obtained by using a catalyst having a titanium trichloride composition combined with an alkoxyaluminum compound and an ester compound (Japanese patent publication No. Sho 64-9,325), polypropylene obtained by subjecting a non-linear olefin such as 4-methylpentene-1 to preliminary polymerization using a catalyst consisting of a titanium trichloride composition and an organoaluminum compound, followed by polymerizing propylene (Japanese patent application laid-open No. Sho 61-155,404), polypropylene obtained by using a catalyst having a titanium trichloride composition combined with an organoaluminum compound, an organometal-intermolecular coordination compound and further an electron donor (Japanese patent application laid-open No. Sho 62-100,505), etc., polypropylene obtained by using a catalyst having the so-called supported type solid catalyst component obtained by having TiCl$_4$ supported on a Mg compound combined with an organoaluminum compound and further an organosilicon compound (Japanese patent application laid-open No. Sho 58-83,006, Japanese patent application laid-open No. Sho 64-66,217), etc.

However, polypropylenes disclosed in the above Japanese patent publication No. Sho 64-9,325) and Japanese patent application laid-open No. Sho 62-100,505 have been insufficient in the stereoregularity as the whole of the polymer; hence the stiffness, heat resistance, etc. of molded products obtained by using the polypropylenes have been insufficient. Further, polypropylenes disclosed in Japanese patent application laid-open Nos. Sho 58-83,006, Sho 61-155,404 and Sho 64-6,621 have a stereoregularity to a definite extent, but since they have a narrow molecular weight distribution, their durability has been extremely insufficient. Further, the polypropylene disclosed in Japanese patent application laid-open No. Sho 61-155,404 has an improved transparency to a definite extent, but the improvement is still insufficient, and besides, the polypropylenes disclosed in Japanese patent publication No. Sho 64-9,325, Japanese patent application laid-open Nos. Sho 58-83,006, Sho 62-100,505 and Sho 64-6,621 are extremely insufficient in the transparency.

On the other hand, as a technique for providing a polypropylene having an improved transparency, a process of using a catalyst consisting of a titanium compound and an organoaluminum compound, using subjecting a non-linear olefin such as vinylcyclohexane, etc. to preliminary polymerization, followed by polymerizing propylene (Japanese patent application laid-open No. Sho 60-139,710) is mentioned. While the polypropylene obtained according to the process is observed to have an improved transparency to a definite extent, there has been raised a problem that the resulting polymer is uneven due to polymerization unstability caused by inferior shape of the catalyst component after the preliminary polymerization, and further, the stiffness and durability have been inferior due to insufficient stereoregularity and narrow molecular weight distribution.

In view of the present status of the above-mentioned prior art, the present inventors have made extensive research in order to find a polypropylene having a broad molecular weight distribution and an extremely high stereoregularity and affording a molded product having a notably superior transparency, stiffness and durability according to a conventional molding process, even without adding any particular additive, and as a result, we have found that when a novel polypropylene satisfying the requirements of the present invention, described below, is subjected to molding processing, then it is possible to obtain a molded product having a far superior transparency, stiffness and durability, and have completed the present invention in the second aspect.

As apparent from the foregoing, an object of the present invention in the second aspect is to provide a novel polypropylene capable of producing a molded product having a far superior transparency, stiffness and durability. Another object is to broaden the fields of concrete use applications.

SUMMARY OF THE INVENTION

The present invention has the following constitutions:

(1) A process for producing a high-stiffness polypropylene which comprises polymerizing propylene using a catalyst obtained by combining ① a titanium trichloride composition (III) obtained by reacting TiCl$_4$ with an organoaluminum compound (A$_1$) or a reaction product (I) of an organoaluminum compound (A$_1$) with an electron donor (B$_1$) to obtain a solid product (II), followed by subjecting said solid product (II) to a multi-stage polymerization treatment with a linear olefin and a non-linear olefin, each once or more times used, to form a linear olefin-non-linear olefin block copolymer in a ratio by weight of a linear olefin polymer block therein to a non-linear olefin polymer block therein of 2/98 to 98/2, followed by further reacting said block copolymer with an electron donor (B$_2$) and an electron acceptor to obtain said titanium trichloride composition (III), which contains 0.1 to 49.5% by weight of said linear olefin polymer block and 0.01 to 49.5% by weight of said non-linear olefin polymer block;

② an organoaluminum compound (A); and

③ an aromatic carboxylic acid ester (E), the molar ratio of said aromatic carboxylic acid ester (E) to said titanium trichloride composition (III), that is, (E)/(III) being made 0.1 to 10.0, and the molar ratio of said organoaluminum compound (A$_2$) to said titanium trichloride composition (III), that is, (A$_2$)/(III) being made 0.1 to 200.

(2) A production process according to item (1) wherein said organoaluminum compound ($A_1$) is expressed by the formula $AlR^1_p R^2_{p'} X_{3-(p+p')}$ wherein $R^1$ and $R^2$ each represent a hydrocarbon radical selected from an alkyl group, a cycloalkyl group or an aryl group, X represents a halogen atom and p and p' each represent an optional number satisfying an expression of $0 < p+p' < 3 =$.

(3) A production process according to item (1) wherein said non-linear olefin is a saturated ring-containing hydrocarbon monomer expressed by the formula $$CH_2=CH-R^3$$

wherein $R^3$ represents a saturated ring-containing hydrocarbon radical of 3 to 18 carbon atoms having a saturated ring structure of a hydrocarbon, which structure may contain silicon atom and which radical may contain silicon atom.

(4) A production process according to item (1), wherein said non-linear olefin is a branched olefin expressed by the formula $$CH_2=CH-\overset{R^5}{\underset{R^7}{R^4}}-R^6$$

wherein $R^4$ represents a chain hydrocarbon radical of 1 to 3 carbon atoms which may contain silicon atom or silicon atom, $R^5$, $R^6$ and $R^7$ each represent a chian hydrocarbon radical of 1 to 6 carbon atoms which may contain silicon atom, but any one of $R^5$, $R^6$ and $R^7$ may be hydrogen atom.

(5) A production process according to item (1), wherein said non-linear olefin is an aromatic monomer expressed by the formula

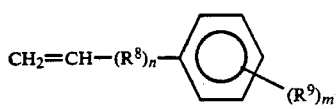

wherein n represents 0 or 1, m represents 1 or 2, $R^8$ represents a chian hydrocarbon radical of 1 to 6 carbon atoms which may contain silicon atom and $R^9$ represents a hydrocarbon radical of 1 to 12 carbon atoms which may contain silicon atom, hydrogen atom or a halogen atom, and in the case of m=2, the respective $R^9$s may be same or different.

(6) A production process according to item (1), wherein said organoaluminum compound ($A_2$) is a dialkylaluminum monohalide.

(7) A production process according to item (1), wherein a preactivated catalyst component obtained by combining said titanium trichloride composition(III) with an organoaluminum compound, followed by reacting a small quantity of an olefin with the resulting combination is used in place of said titanium trichloride composition(III).

(8) A production process according to item (1), wherein the relationship between the isotactic pentad ratio (P) and the melt flow rate (MFR) of the resulting polypropylene satisfies the following expression:

$$1.00 \geq P \geq 0.015 \log MFR + 0.955.$$

(9) A highly stereoregular polypropylene obtained by polymerizing propylene using a catalyst obtained by combining ① a titanium trichloride composition (III) obtained by reacting $TiCl_4$ with an organoaluminum compound ($A_1$) or a reaction product (I) of an organoaluminum compound ($A_1$) with an electron donor ($B_1$) to obtain a solid product (II), followed by subjecting said solid product (II) to a multi-stage polymerization treatment with a linear olefin and a non-linear olefin, each once or more times used, and further reacting the resulting linear olefin-non-linear olefin block copolymer with an electron donor ($B_2$) and an electron acceptor, ② an organoaluminum compound ($A_2$); and as a third component, ③ an aromatic carboxylic acid ester (E) or an organosilicon compound (S) having a Si—O—C bond and/or a mercapto group, the resulting polypropylene having a melt flow rate (MFR) of 0.1 to 100 (g/10 min., 230° C., load 2.16 Kgf), an isotactic pentad ratio (P) of 0.975 to 0.990, a ratio of its weight average molecular weight to its number average molecular weight (Q) of 7 to 30 and a weight average molecular weight of 100,000 to 1,000,000.

(10) A highly stereoregular polypropylene according to item (9), wherein a preactivated catalyst component obtained by combining said titanium trichloride composition (III) with an organoaluminum compound, followed by reacting an olefin with the resulting combination is used in place of said titanium trichloride composition (III).

DETAILED DESCRIPTION OF PREFERRED EMBODIMENTS

Figure 1:
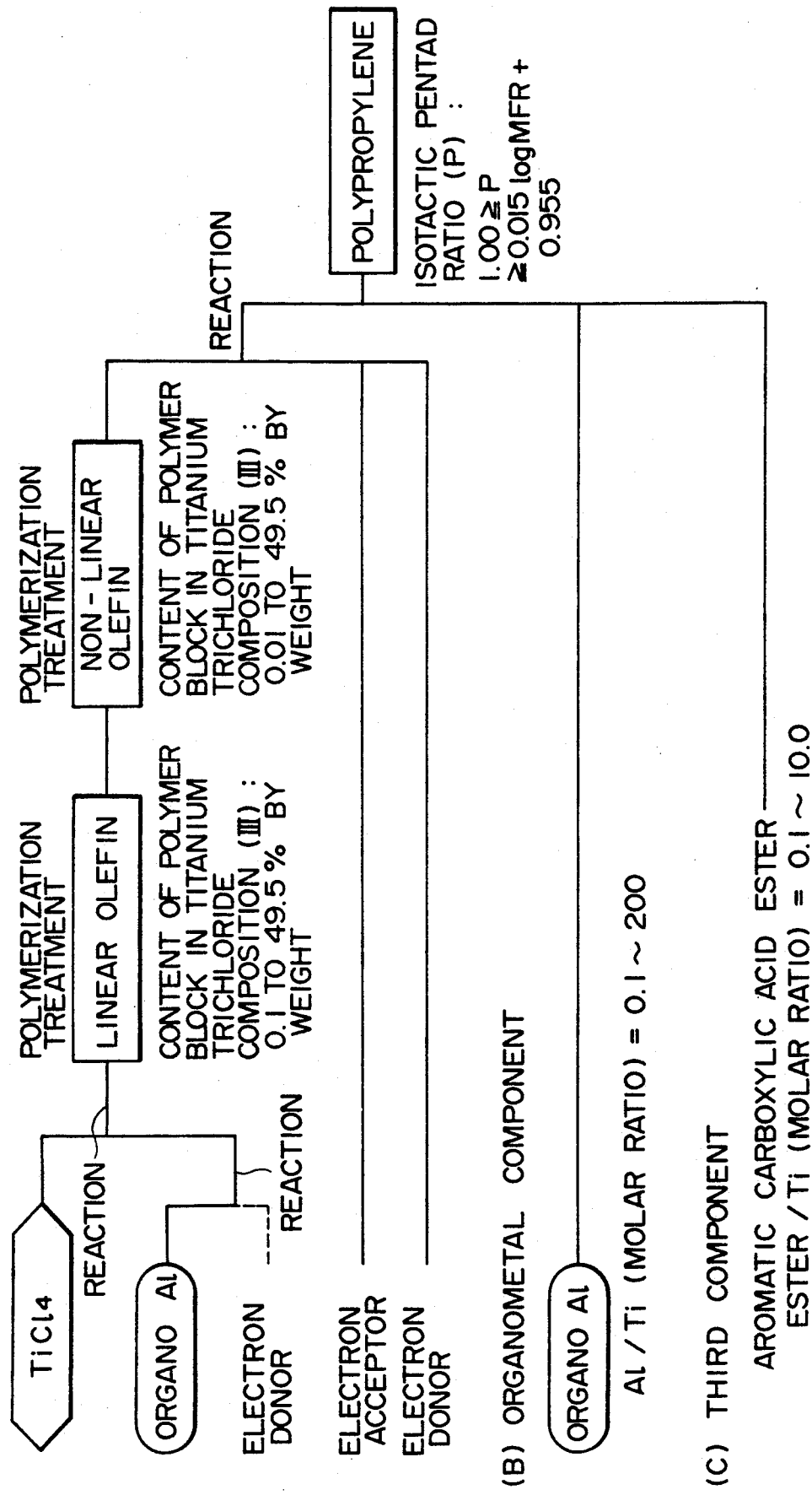
FIGS. 1 and 2 show a flow sheet illustrating the process for producing polypropylene of the present invention in the first aspect and the second aspect, respectively.
Figure 2:
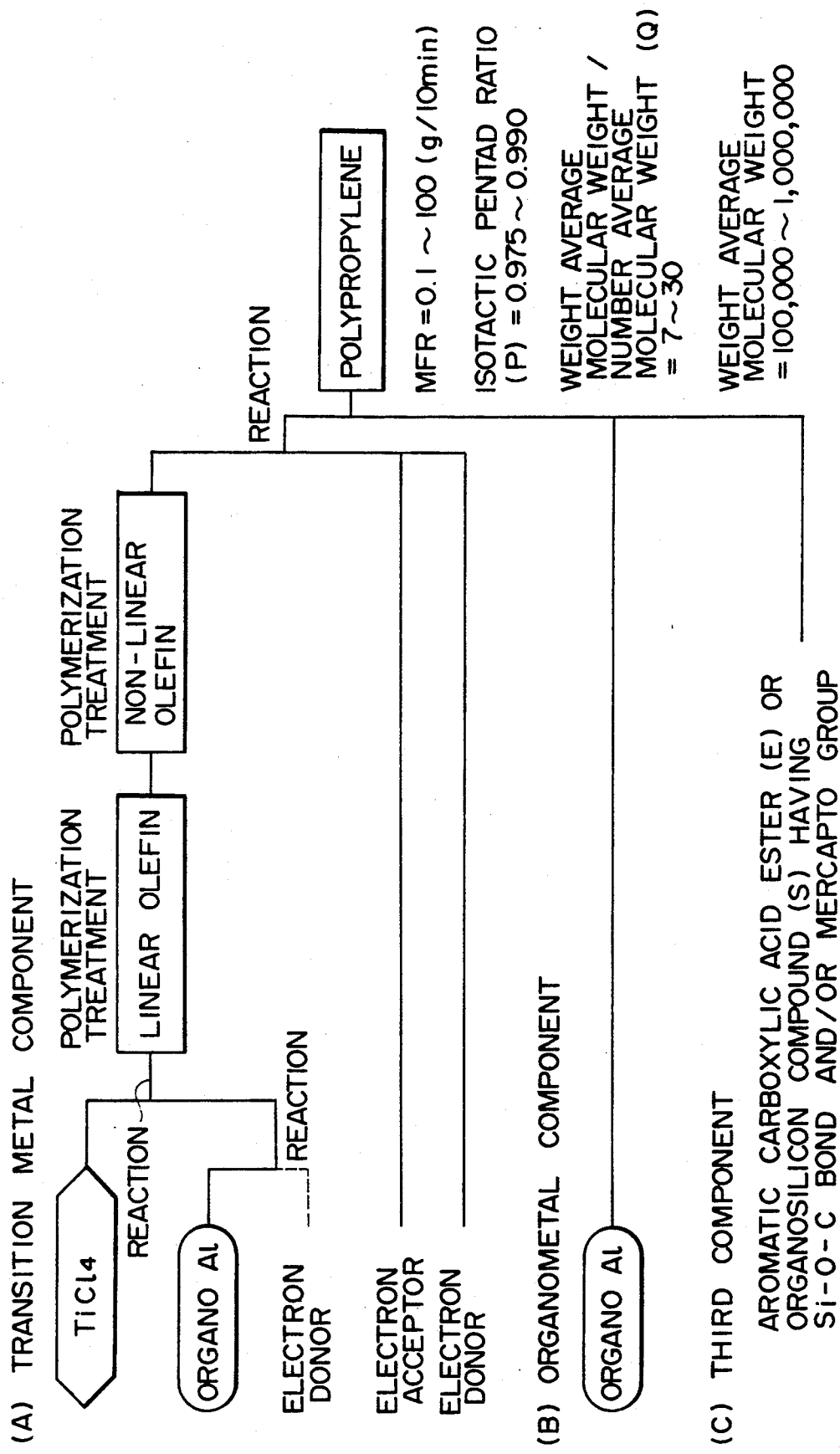

The constitution of the present invention in the first aspect will be described in more detail.

The titanium trichloride composition (III) used in the present invention comprises a linear olefin-non-linear olefin block copolymer (hereinafter abbreviated to a specified block copolymer) having at least one linear olefin polymer block and at least one non-linear olefin polymer block. A process for producing the composition (III) will be described.

The preparation of the titanium trichloride composition (III) is carried out as follows:

Firstly, an organoaluminum compound ($A_1$) is reacted with an electron donor ($B_1$) to obtain a reaction product (I), followed by reacting the product (I) with $TiCl_4$ or with an organoaluminum compound ($A_1$) and $TiCl_4$ to obtain a solid product (II), subjecting this product (II) to a multi-stage polymerization treatment with ① a linear olefin and ② a non-linear olefin, each once or more times used, to form a linear olefin-non-linear olefin block copolymer, and further reacting this block copolymer with an electron donor ($B_2$) and an electron acceptor to obtain a final solid product (III) i.e. a titanium trichloride composition (III).

In addition, "polymerization treatment" referred to in the present invention means that a linear olefin or a non-linear olefin is contacted with the solid product (II) under polymerizable conditions to thereby polymerize the linear olefin or the non-linear olefin. By this polymerization treatment, the solid product (II) forms a state coated with the polymers.

The reaction of the organoaluminum compound ($A_1$) with the electron donor ($B_1$) is carried out in a solvent (D) at $-20°$ C. to $+200°$ C., preferably $-10°$ C. to $+100°$ C., for 30 seconds to 5 hours. The addition order of the organoaluminum compound ($A_1$), ($B_1$) and (D) has no particular limitation, and the respective proportions of quantities thereof used are 0.1 to 8 mols, preferably 1 to 4 mols of the electron donor ($B_1$), and 0.5 to 5l, preferably 0.5 to 2l of the solvent, each based on one mol of the organoaluminum compound ($A_1$).

Thus, the reaction product (I) is obtained. The product (I) may be subjected to the subsequent reaction, without separating it, that is, in a liquid state after completion of the reaction (hereinafter referred to often as reaction liquid (I)) as it is.

The process of subjecting the solid product (II) obtained by reacting the reaction product (I) with $TiCl_4$ or with an organoaluminum compound ($A_1$) and $TiCl_4$, to a multi-stage polymerization treatment with a linear olefin and a non-linear olefin, includes ① a process of adding a linear olefin and a non-linear olefin at a multi-stage during an optional process of the reaction of the reaction product (I) or the organoaluminum compound ($A_1$) with $TiCl_4$ to thereby subject the solid product (II) to a multi-stage polymerization treatment;

② a process of adding a linear olefin and a non-linear olefin at a multi-stage after completion of the reaction of the reaction product (I) or an organoaluminum compound ($A_1$) with $TiCl_4$ to thereby subject the solid product (II) to a multi-stage polymerization treatment; and ③ a process of separating and removing a liquid portion by filtering off or decantation after completion of the reaction of the reaction product (I) or an organoaluminum compound ($A_1$) with $TiCl_4$, followed by suspending the resulting solid product (II) in a solvent and further adding an organoaluminum compound and thereafter adding a linear olefin and a non-linear olefin at a multi-stage to effect polymerization treatment.

Further, as to the order of the polymerization treatment at a multi-stage with a linear olefin and a non-linear olefin, either of the linear olefin or the non-linear olefin may be used in advance, but in the aspects of the polymerization operability at the time of using the resulting final titanium trichloride composition (III) as well as the quality of the resulting polyolefin, it is preferred to ① first carry out the polymerization treatment with the linear olefin and ② successively carry out the polymerization treatment with the non-linear olefin. By this multi-stage polymerization treatment, the linear olefin-non-linear olefin block copolymer is formed, and the solid product (II) forms a state coated by the block copolymer.

Still further, the multi-stage polymerization treatment is carried out using a linear olefin and a non-linear olefin each once or more times, as described, to obtain the titanium trichloride composition (III) for achieving the object of the present invention, but it is also possible to carry out the polymerization treatment twice or more, for example, by further adding ③ a linear olefin after the polymerization treatment with the non-linear olefin to carry out an additional polymerization treatment.

The reaction of the reaction product (I) or an organoaluminum compound ($A_1$) with $TiCl_4$ is carried out at $-10°$ C. to $+200°$ C., preferably $0°$ C. to $100°$ C. for 5 minutes to 10 hours, irrespective of whether a linear olefin and a non-linear olefin are added or not added during an optional process of the reaction.

While it is preferred to use no solvent, it is also possible to use an aliphatic or aromatic hydrocarbon. Mixing of the reaction product (I) or an organoaluminum compound ($A_1$), $TiCl_4$ and a solvent may be carried out in an optional order, and the addition of a linear olefin and a non-linear olefin may also be carried out at any stage.

Mixing of the total quantity of the reaction product (I) or an organoaluminum compound ($A_1$), $TiCl_4$ and a solvent is preferred to be completed within 5 hours, and the reaction is carried out even during the mixing. After the mixing of the total quantity, the reaction is preferred to be continued further within 5 hours.

As to the respective quantities of these materials used in the reaction, the quantity of the solvent is 0 to 3,000 ml based on one mol of $TiCl_4$, and as to the quantities of the reaction product (I) or the organoaluminum compound ($A_1$), the ratio of the number of Al atoms in the (I) or the ($A_1$) to the number of Ti atoms in $TiCl_4$ (Al/Ti) is 0.05 to 10, preferably 0.06 to 0.3.

As to the polymerization treatment with a linear olefin and a non-linear olefin, ① in the case where the linear olefin and the non-linear olefin are added during an optional process of the reaction of the reaction product (I) or an organoaluminum compound ($A_1$) with $TiCl_4$, and ② in the case where a linear olefin and a non-linear olefin are added after completion of the reaction of the reaction product (I) or an organoaluminum compound ($A_1$) with $TiCl_4$, a multi-stage polymerization is carried out in either of polymerization treatment with a linear olefin or a non-linear olefin, using 0.1 g to 100 Kg of a linear olefin and 0.01 g to 100 Kg of a non-linear olefin based on 100 g of the solid product (II), under conditions of a reaction temperature of $0°$ to $90°$ C., a reaction time of one minute to 10 hours and a reaction pressure of the atmospheric pressure (0 $Kgf/cm^2G$) to 10 $Kgf/cm^2G$, so as to give a content of the linear olefin polymer block in the final solid product (III) i.e. the titanium trichloride composition (III) of 0.1 to 49.5% by weight, and a content of the non-linear olefin polymer block therein of 0.01 t 49.5% by weight and also so as to give a ratio by weight of the linear olefin polymer block to the non-linear olefin polymer block of 2/98 to 98/2.

If the content of the linear olefin polymer block is lower than 0.1% by weight, improvement in the operating properties at the time of using the resulting titanium trichloride composition and the effect of inhibiting voids in the resulting polyolefin are insufficient, while even if the content exceeds 49.5% by weight, the improvement in the effect is not notable, resulting in operational and economical disadvantages.

Further, the ratio by weight of the linear olefin polymer block to the non-linear olefin polymer block is preferred to be 2/98 to 98/2 in view of the balance among the effect of improving the operating properties, the voids-inhibiting effect and the effect of improving the transparency.

In the case ③ where the multi-stage polymerization treatment with a linear olefin and a non-linear olefin is carried out by separating and removing a liquid portion by filtering-off or decantation after completion of the reaction of the reaction product (I) or an organoaluminum compound ($A_1$) with $TiCl_4$, followed by suspending the resulting solid product (II) in a solvent, the multi-stage polymerization is carried out in either polymerization treatment with a linear olefin or a non-linear olefin, in the presence of 100 to 5,000 ml of a solvent and 0.5 to 5,000 g of an organoaluminum compound based on 100 g of the solid product (II), under the conditions of a reaction temperature of 0° to 90° C., a reaction time of one minute to 10 hours and a reaction pressure of the atmospheric pressure (0 Kgf/cm²G) to 10 Kgf/cm²G, using 0.1 g to 100 Kg of a linear olefin and 0.01 g to 100 Kg of a non-linear olefin based on 100 g of the solid product and so as to give a content of the linear olefin polymer block in the final solid product (III) i.e. the titanium trichloride composition (III) of 0.1 to 49.5% by weight, and a content of the non-linear olefin polymer block therein of 0.01 to 49.5% by weight and also so as to give a ratio by weight of the linear olefin polymer block to the non-linear olefin polymer block of 2/98 to 98/2.

In the case of any of the above-mentioned multi-stage polymerization treatments, the reaction mixture after completion of the polymerization treatments at the respective stages may be used, as it is, for the polymerization treatment at the subsequent stage. Further, the coexisting solvent, unreacted linear olefin or non-linear olefin and an organoaluminum compound, etc. may be removed by filtering off, decantation, etc., followed by again adding a solvent and an organoaluminum compound and using the resulting mixture for the subsequent stage polymerization treatment with a non-linear olefin or a linear olefin.

The solvent used at the time of the polymerization treatment is preferred to be an aliphatic hydrocarbon, and the organoaluminum compound may be the same as or different from that used when the reaction product (I) is obtained, or that used directly for the reaction with TiCl₄, without reacting with an electron donor (B₁).

After completion of the reaction, a liquid portion is separated and removed by filtering-off or decantation, followed by further repeatedly washing with a solvent, and the resulting solid product subjected to polymerization treatment (hereinafter referred to often as solid product (II-A)) may be used for the subsequent process in a state suspended in the solvent as it is, or may be further dried, taken out in the form of a solid substance and used.

The solid product (II-A) is then reacted with an electron donor (B₂) and an electron acceptor (F). This reaction may be carried out without using any solvent, but use of an aliphatic hydrocarbon solvent affords preferred results.

The quantities of these materials used are 0.1 to 1,000 g, preferably 0.5 to 200 g of (B₂), 0.1 to 1,000 g, preferably 0.2 to 500 g of (F) and 0 to 3,000 ml, preferably 100 to 1,000 ml of the solvent, each based on 100 g of the solid product (II-A).

The reaction method includes ① a process of simultaneously reacting an electron donor (B₂) and an electron acceptor (F) with the solid product (II-A), ② a method of reacting (F) with (II-A), followed by reacting (B₂), ③ a method of reacting (B₂) with (II-A), followed by reacting (F) and ④ a method of reacting (B₂) with (F), followed by reacting (II-A), but any of these methods may be employed.

As to the reaction conditions, in the case of the above methods ① and ② 40° to 200° C., preferably 50° to 100° C. and 30 seconds to 5 hours are preferred, and in the case of the method ③, (II-A) is reacted with (B₂) at 0° to 50° C. for one minute to 3 hours, followed by reacting with (F) under the same conditions as in the methods ① and ②.

Further, in the case of the method ④, (B₂) is reacted with (F) at 10° to 100° C. for 30 minutes to 2 hours, followed by cooling down to 40° C. or lower, adding (II-A) and reacting under the same conditions as in the above methods ① and ②.

After completion of the reaction of the solid product (II-A), (B₂) and (F), a liquid portion is separated and removed by filtering-off or decantation, followed by further repeatedly washing with a solvent to obtain a final titanium trichloride composition (III) used in the present invention, containing a linear olefin-non-linear olefin block copolymer in a ratio by weight of a linear olefin polymer block to a non-linear olefin polymer block of 2/98 to 98/2, the content of the linear olefin polymer block therein being 0.1 to 49.5% by weight and the content of the non-linear olefin polymer block therein being 0.01 to 49.5% by weight.

As the organoaluminum compound (A₁) used for preparing the titanium trichloride composition (III) used in the present invention in the first aspect, an organoaluminum compound expressed by the formula $AlR^1R^1_pR^2_{p'}X_{3-(p+p')}$ wherein $R^1$ and $R^2$ each represent a hydrocarbon radical such as an alkyl group, a cycloalkyl group, an aryl group, etc. or an alkoxy group, X represents a halogen atom and p and p' each represent an optional number satisfying an expression of $0 < p+p' \leq 3$.

Its concrete examples are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., dialkylaluminum hydrides such as diethylaluminum hydride, etc., alkylaluminum sesquihalides such as methylaluminum sesquichloride, ethylaluminum sesquichloride, etc., monoalkylaluminum dihalides such as ethylaluminum dichloride, i-butylaluminum dichloride, etc., and besides, alkoxyalkylaluminums such as monoethoxydiethylaluminum, diethoxymonoethylaluminum, etc. These organoaluminum compounds may be used in admixture of two or more kinds thereof.

As the electron donor used in the present invention, various examples thereof are mentioned below, but it is preferred that ethers are mainly used as (B₁) and (B₂) and other electron donors are used together with ethers.

Examples of the electron donor are organic compounds having any atom(s) of O, N, S and P i.e. ethers, alcohols, esters, aldehydes, aliphatic acids, ketones, nitriles, amines, amides, ureas, thioureas, isocyanates, azo compounds, phosphines, phosphites, phosphinites, H₂S, thioethers, thio alcohols, etc.

Concrete examples are ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, tetrahydrofuran, etc., alcohols such as methanol, ethanol, propanol, butanol, pentanol, hexanol, octanol, phenol, cresol, xylenol, ethylphenol, naphthol, etc., phenols, esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate, etc., aldehydes such as acetaldehyde, benzoaldehyde, etc., aliphatic acids such as formic acid, acetic acid, propionic acid, butyric acid, oxalic acid, succinic acid, acrylic acid, maleic acid, etc., aromatic acids such as benzoic acid, etc., ketones such as methyl ethyl ketone, methyl isobutyl ketone, benzophenone, etc., nitriles such as acetonitrile, etc., amines such as methylamine, diethylamine, tributylamine, triethanolamine, $\beta$(N,N-dimethylamino)ethanol, pyridine, quinoline, $\alpha$-picoline, 2,4,6-trimethylpyridine, N,N,N',N'-tetramethylethylenediamine, aniline, dimethylaniline, etc., amides such as formamide, hexamethylphosphoric acid triamide, N,N,N',N',N''-pentamethyl-N'-$\beta$-dimethylaminomethylphosphoric acid triamide, octamethylpyrophosphoroamide, etc., ureas such as N,N,N',N'-tetramethylurea, etc., isocyanates such as phenyl isocyanate, toluyl isocyanate, etc., azo compounds such as azobenzene, etc., phosphines such as ethylphosphine, triethylphosphine, tri-n-butylphosphine, tri-n-octylphosphine, triphenylphosphine, triphenylphosphine oxide, etc., phosphites such as dimethylphosphite, di-n-octylphosphite, triethylphosphite, tri-n-butylphosphite, triphenylphosphite, etc., phosphinites such as ethyldiethylphosphinite, ethylbutylphosphinite, phenyldiphenylphosphinite, etc., thioethers such as diethyl thioether, diphenyl thioether, methyl phenyl thioether, ethylene sulfide, propylene sulfide, etc., thioalcohols such as ethyl thioalcohol, n-propyl thioalcohol, thiophenol, etc.

These electron donors may be used in admixture thereof. The electron donor (B$_1$) for obtaining the reaction product (I) and the electron donor (B$_2$) to be reacted with the solid product (II-A) may be same or different.

The electron acceptor (F) used in the present invention in the first aspect is those represented by halides of elements belonging to Groups III to VI of the Periodic Table. Concrete examples thereof are anhydrous aluminum chloride, SiCl$_4$, SnCl$_2$, SnCl$_4$, TiCl$_4$, ZrCl$_4$, PCl$_3$, PCl$_5$, VCl$_4$, SbCl$_5$, etc. These may be used in admixture. TiCl$_4$ is most preferred.

As the solvent, the following are used: aliphatic hydrocarbons such as n-pentane, n-hexane, n-heptane, n-octane, i-octane, etc. are used, and in place of or together with aliphatic hydrocarbons, halogenated hydrocarbons may also be used such as CCl$_4$, chloroform, dichloroethane, trichloroethylene, tetrachloroethylene, etc.

Examples of the aromatic compounds are aromatic hydrocarbons e.g. naphthalene, etc., their derivativatives such as alkyl derivatives e.g. mesitylene, durene, ethylbenzene, isopropylbenzene, 2-ethylnaphthalene, 1-phenylnaphthalene, etc., halides such as monochlorobenzene, chlorotoluene, chloroxylene, chloroethylbenzene, dichlorobenzene, bromobenzene, etc.

As the linear olefin used for the polymerization treatment, linear olefins such as ethylene, propylene, butene-1, pentene-1, hexene-1, etc. are used, and particularly, ethylene and propylene are preferably used. These linear olefins are used alone or in admixture thereof.

The non-linear olefin used for the polymerization treatment includes

① a saturated ring-containing hydrocarbon monomer expressed by the formula

$CH_2=CH-R^3$ wherein R$^3$ represents a saturated ring-containing hydrocarbon radical of 3 to 18 carbon atoms which has a saturated ring structure of hydrocarbon, which structure may contain silicon atom and which radical may contain silicon atom;

② a branched olefin expressed by the formula

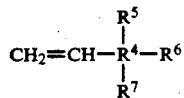

wherein R$^4$ represents a chain hydrocarbon radical of 1 to 3 carbon atoms which may contain silicon atom or silicon atom, and R$^5$, R$^6$ and R$^7$ each represent a chain hydrocarbon radical of 1 to 6 carbon atoms which may contain silicon atom, but any one of R$^5$, R$^6$ and R$^7$ may be hydrogen atom; and ③ an aromatic monomer expressed by the formula

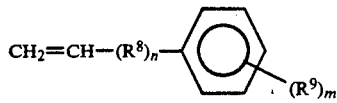

wherein n represents 0 or 1, m represents 1 or 2, R$^8$ represents a chain hydrocarbon radical of 1 to 6 carbon atoms which may contain silicon atom and R$^9$ represents a hydrocarbon radical of 1 to 12 carbon atoms which may contain silicon atom, hydrogen atom or halogen atom, and in the case of m=2, the respective R$^9$s may be same or different.

Concrete examples of the saturated ring-containing hydrocarbon monomer ① are vinylcycloalkanes such as vinylcyclopropane, vinylcyclobutane, vinylcyclopentane, 3-methylvinylcyclopentane, vinylcyclohexane, 2-methylvinylcyclohexane, 3-methylvinylcyclohexane, 4-methylvinylcyclohexane, vinylcycloheptane, etc., allylcycloalkanes such as allylcyclopentane, allylcyclohexane, etc., and besides, saturated ring-containing hydrocarbon monomers having silicon atom in the saturated ring structure such as cyclotrimethylenevinylsilane, cyclotrimethylenemethylvinylsilane, cyclotetramethylenevinylsilane, cyclotetramethylenemethylvinylsilane, cyclopentamethylenevinylsilane, cyclopentamethylenemethylvinylsilane, cyclopentamethyleneethylvinylsilane, cyclohexamethylenevinylsilane, cyclohexamethylenemethylvinylsilane, cyclohexamethyleneethylvinylsilane, cyclotetramethyleneallylsilane, cyclotetramethylenemethylallylsilane, cyclopentamethyleneallylsilane, cyclopentamethylenemethylallylsilane, cyclopentamethyleneethylallylsilane, etc., saturated ring-containing hydrocarbon monomers containing silicon atom outside the saturated ring structure such as cyclobutyldimethylvinylsilane, cyclopentyldimethylvinylsilane, cyclopentylethylmethylvinylsilane, cyclopentyldiethylvinylsilane, cyclohexylvinylsilane, cyclohexyldimethylvinylsilane, cyclohexylethylmethylvinylsilane, cyclobutyldimethylallylsilane, cyclopentyldimethylallylsilane, cyclohexylmethylallylsilane, cyclohexyldimethylallylsilane, cyclohexylethylmethylallylsilane, cyclohexyldiethylallylsilane, 4-trimethylsilylvinylcyclohexane, 4-trimethylsilylallylcyclohexane, etc.

Concrete examples of the branched olefin ② are branched olefins at 3-position such as 3-methylbutene-1, 3-methylpentene-1, 3-ethylpentene-1, etc., branched olefins at 4-position such as 4-ethylhexene-1, 4,4-dimethylpentene-1, 4,4-dimethylhexene-1, etc., alkenylsilanes such as vinyltrimethylsilane, vinyltriethylsilane, vinyltri-n-butylsilane, allyltrimethylsilane, allylethyldimethylsilane, allyldiethylmethylsilane, allyltriethylsilane, allyltri-n-propylsilane, 3-butenyltrimethylsilane, 3-butenyltriethylsilane, etc., diallylsilanes such as dimethyldiallylsilane, ethylmethyldiallylsilane, diethyldiallylsilane, etc.

Further, concrete examples of the aromatic monomer ③ are styrene, as derivatives of styrene, alkylstyrenes such as o-methylstyrene, p-t-butylene, etc., dialkylstyrenes such as 2,4-dimethylstyrene, 2,5-dimethylstyrene, 3,4-dimethylstyrene, 3,5-dimethylstyrene, etc., halogen-substituted styrenes such as 2-methyl-4-fluorostyrene, 2-ethyl-4-chlorostyrene, o-fluorostyrene, p-fluorostyrene, etc., trialkylsilylstyrenes such as p-trimethylsilylstyrene, m-triethylsilylstyrene, p-ethyldimethylsilylstyrene, etc., allyltoluenes such as o-allyltoluene, p-allyltoluene, etc., allylxylenes such as 2-allyl-p-xylene, 4-allyl-o-xylene, 5-allyl-m-xylene, etc., alkenylphenylsilanes such as vinyldimethylphenylsilane, vinylethylmethylphenylsilane, vinyldiethylphenylsilane, allyldimethylphenylsilane, allylethylmethylphenylsilane, etc., further, 4-(o-tolyl)butene-1, 1-vinylnaphthalene, etc. These non-linear olefins are used alone or in admixture.

The thus obtained titanium trichloride composition (III) is combined with an organoaluminum ($A_2$) and an aromatic carboxylic acid ester (E) in definite quantities mentioned below to prepare the catalyst of the present invention, or preferably by further reacting an olefin with the combination obtained above to obtain a preactivated catalyst.

The polymerization form of the propylene polymerization using the above catalyst has no particular limitation, and not only liquid phase polymerization such as slurry polymerization and bulk polymerization, but also gas phase polymerization ar adequately employed. In the case of slurry polymerization or bulk polymerization, even a catalyst obtained by combining the titanium trichloride composition (III) with an organoaluminum compound ($A_2$) and an aromatic carboxylic acid (E) exhibits a sufficient effect, but in the case of gas phase polymerization, it is preferred to use a preactivated catalyst component having a higher activity, obtained by combining the titanium trichloride composition (III) with an organoaluminum compound in place of the titanium trichloride composition (III), followed by reacting an olefin with the resulting combination.

In the case where slurry polymerization or bulk polymerization is succeeded by gas phase polymerization, even when the initially used catalyst is the former catalyst, since the reaction of propylene has already been carried out at the time of gas phase polymerization, the same catalyst as the latter catalyst is formed to exhibit a superior effect.

For the preactivation, it is preferred to polymerize an olefin using 0.005 to 500 g of an organoaluminum, 0 to 50 l of a solvent, 0 to 1,000 ml of hydrogen and 0.01 to 5,000 g, preferably 0.05 to 3,000 g of an olefin, each based on 1 g of the titanium trichloride compositition (III), at 0° to 100° C. and for one minute to 20 hours.

The reaction of an olefin for the preactivation may be carried out either in an aliphatic or aromatic hydrocarbon solvent such as n-pentane, n-hexane, n-heptane, toluene, etc. or in a liquefied olefin such as liquefied propylene, liquefied butene-1, etc., without using any solvent, or an olefin such as ethylene, propylene, etc. may be reacted in gas phase, or the reaction may be carried out making an olefin polymer or hydrogen coexistent in advance. Further, in the preactivation, it is also possible to add an aromatic carboxylic acid ester (E).

Examples of the olefin used for the preactivation are linear olefins such as ethylene, propylene, butene-1, pentene-1, hexene-1, heptene-1, octene-1, etc., branched monoolefins such as 4-methyl-pentene-1, 2-methyl-pentene-1, etc. and at least one kind of olefins may be used. Further, as the organoaluminum compound, the same as the above-mentioned ($A_1$) may be used, but preferably, the same dialkylaluminum monohalides as ($A_2$) mentioned later may be used.

After completion of the preactivation reaction, a catalyst obtained by adding a definite quantity of an aromatic carboxylic acid ester (E) to the above preactivated catalyst component slurry may be used, as it is, for propylene polymerization, or a catalyst obtained by removing coexisting solvent, unreacted olefin and an organoaluminum compound by filtering-off or decantation, followed by drying, to obtain a powder material, or a material having a solvent added to the above powder material to prepare a suspension, followed by combining an aluminum compound ($A_2$) and an aromatic carboxylic acid ester (E) with the suspension to obtain a catalyst for propylene polymerization, may be used, or a catalyst obtained by removing coexisting solvent and unreacted olefin b vaporization by means of reduced distillation, passing of an inert gas flow, etc., followed by adding an aluminum compound ($A_2$) to the resulting powder or a suspension obtained by adding a solvent to the powder, further adding an organoaluminum compound ($A_2$) to the mixture, if necessary, and still further combining the resulting mixture with an aromatic carboxylic acid ester (E), to obtain a catalyst for propylene polymerization, may be used.

At the time of the propylene polymerization, as to the respective quantities of the above titanium trichloride composition (III), organoaluminum compound ($A_2$) and aromatic carboxylic acid ester (E) used, they are used so as to give a mol ratio of the aromatic carboxylic acid ester (E) to the titanium trichloride composition (III) (E)/(III) in the range of 0.1 to 10.0 and a molar ratio of the organoaluminum compound ($A_2$) to the titanium trichloride composition (III) ($Al_2$/(III)) in the range of 0.1 to 200, preferably 0.1 to 100.

If the quantity of the aromatic acid ester (E) added is small, improvement in the isotacticity is insufficient so that no high stiffness is obtained, while if it is too large, the resulting polymerization activity lowers and hence such large quantity is unpractical. In addition, the number of mols of the titanium trichloride composition (III) substantially refers to the number of Ti gram atoms contained in (III).

At the time of propylene polymerization, as the organoaluminum compound ($A_2$) to be combined with the titanium trichloride composition, dialkylaluminum monohalides expressed by the formula $AlR^{10}R^{11}X$ are preferred. In the formula, and $R^{11}$ each represent a hydrocarbon radical such as alkyl group, cycloalkyl group, aryl group, arkaryl group, etc. or alkoxy group and X represents a halogen.

Its concrete examples are diethylaluminum monochloride, di-n-propylaluminum monochloride, di-i-butylaluminum monochloride, di-n-butylaluminum monochloride, diethylaluminum monoiodide, diethylaluminum monobromide, etc.

Concrete examples of the aromatic carboxylic acid ester (E) as one of the components constituting the catalyst are ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, propyl naphthoate, butyl naphthoate, 2-ethylhexyl naphthoate, ethyl phenylacetate, etc.

The thus obtained catalyst used in the present invention (in the first aspect) is used for propylene polymerization. As to the polymerization form of propylene polymerization, the polymerization may be carried out by sluury polymerization in a hydrocarbon solvent such as n-hexane, n-heptane, n-octane, benzene, toluene, etc. or by bulk polymerization carried out in liquefied propylene or by gas phase polymerization.

As to the polymer crystallinity capable of exhibiting the effectiveness of the present invention with polypropylene obtained according to the above various polymerization forms, the isotactic pentad ratio (P) in relation to the melt flow rate (MFR) is in the range of $1 \geq P \geq 0.015 \log MFR + 0.955$.

There is a tendency that the higher MFR, the higher P, and usually, practical MFR is 0.05 to 200, preferably about 0.1 to 100. The polymerization temperature is usually 20° to 100° C., preferably 40° to 85° C. If the temperature is too low, the polymerization activity becomes low so that such temperature is not practical, while if it is too high, it is difficult to raise the isotacticity. The polymerization pressure is in the range of the atmospheric pressure to 50 Kg/cm$^2$G, and the polymerization time is usually about 30 minutes to 15 hours. In the polymerization, addition of a suitable quantity of hydrogen for adjusting the molecular weight and the like means are the same as those in conventional polymerization processes.

The polypropylene obtained according to the present invention (in the first aspect) is a high stiffness polypropylene having a notably high transparency and used as various molded products according to known injection molding, vacuum molding, extrusion molding, blow molding, etc.

FUNCTION

The high-stiffness polypropylene obtained according to the process of the present invention in the first aspect exhibits a high stiffness due to the high-stiffness polypropylene-producing performance of the catalyst consisting of a combination of definite quantities of the catalyst components used in the present invention although the detailed mechanism is unclear.

Further, since the resulting polypropylene contains the highly stereoregular linear olefin-non-liner olefin block copolymer in a very highly dispersed state, the non-linear olefin polymer block in the specified block copolymer exhibits a nucleus-creating function at the time of melt-molding to thereby promote crystallization of polypropylene so that the transparency and crystallinity of the whole polypropylene are enhanced.

Still further, since the linear olefin polymer block in the linear olefin-non-linear olefin block copolymer has a high compatibility with polypropylene, voids geneated in the film prepared from the polypropylene are very few.

On the other hand, since the specified block copolymer introduced into the polypropylene by way of the titanium trichloride composition (III) used in the present invention in the first aspect is a stereo-regular high molecular weight polymer having a high compatibility with polypropylene, as described above, no bleed thereof onto the surface of polypropylene occurs.

Next, the constitution of the present invention in the second aspect will be described in more detail.

The melt flow rate (MFR) of the polypropylene of the present invention is 0.1 g/10 min. to 100 g/10 min., preferably 0.5 g/10 min. to 80 g/10 min. at 230° C. under a load of 2.16 Kgf. If the MFR is less than 0.1 g/10 min., the fluidity at the time of melting is insufficient, while if it exceeds 100 g/10 min., the strength of the resulting molded product is deficient.

The isotactic pentad ratio (P) as a measure of the stereoregularity of the polypropylene of the present invention which is most characteristic physical properties is 0.975 to 0.990. The isotactic pentad ratio (P) referred to herein means an isotactic ratio in terms of pentad units in the molecule of polypropylene measured using $^{13}$C-NMR (i.e. according to a method announced in Macromolecules 6 925 (1973) by A. Zambelli et al). In other words, the ratio (P) means a proportion of five continuously meso-bonded propylene monomer chain units in the total propylene monomer chain.

However, the above-mentioned method of determining the attribution of NMR absorption peak has been based on the method disclosed in Macromolecules 8 687 (1975).

In addition, the value of the isotactic pentad ratio (P) in the present invention (in the second aspect) refers to a value of isotactic pentad ratio of stereoregular polypropylene itself obtained by polymerization, not a value of isotactic pentad ratio of polypropylene after subjected to extraction, fraction, etc.

If the P value is less than 0.975, the aimed high stiffness and high heat-resistance cannot be achieved. The upper limit of P has no particular limitation, but in the instant status of the present invention, polypropylene having a P of about 0.990 can be actually available due to restriction at the time of polypropylene production in the present invention.

Further, the ratio (Q) of the weight average molecular weight to the number average molecular weight as a measure of the molecular weight distribution which is other specific physical properties of the polypropylene of the present invention (in the second aspect) is 7 to 30. In addition, as to the molecular weight distribution, the ratio (Q) of weight average molecular weight to number average molecular weight has generally been employed, and the ratio means that the higher the Q value, the broader the molecular weight distribution. If the Q value is less than 7, the resulting molded product has an inferior durability, while if it exceeds 30, the moldability is inferior. Further the weight average molecular weight at that time is 100,000 to 1,000,000.

A process for producing the highly stereoregular polypropylene of the present invention satisfying the above-mentioned requirements will be described below.

In the production process of the highly stereo-regular polypropylene of the present invention, firstly a catalyst having combined the titanium trichloride composition (III) and an organoaluminum compound (A$_1$) and as a third component, an aromatic carboxylic acid ester (E) or organosilicon compound(s) having a Si—O—C bond and/or a mercapto group each in a specified ratio relative to the titanium trichloride composition (III) is used. While such a basic embodiment is the same as that of the present invention in the first aspect, there is a concrete difference between them in that the molar ratio of the above (E) or (S) is individually selective.

The preparation of the above titanium trichloride composition (III) is carried out as follows:

An organoaluminum (A₁) is firstly reacted with an electron (B₁) to obtain a reaction product (I), followed by reacting this (I) with TiCl₄ to obtain a solid product (II) or by reacting it with an organoaluminum compound and TiCl₄ to obtain a solid product (II), subjecting the product (II) to polymerization treatment in a multi-stage with ① a linear olefin and ② a non-linear olefin each once or more times, and further reacting to an electron donor (B₂) and an electron acceptor to obtain a final solid product i.e. a titanium trichloride composition (III) used for polypropylene production of the present invention in the second aspect.

In addition, the "polymerization treatment" referred to herein is the same as that described in the present invention in the first aspect.

The reaction product (I) is thus obtained. The product (I) may be used for the subsequent reaction, without separating the solid product (I), that is, in a liquid state (hereinafter referred to often as reaction liquid (I)), as it is.

As the process of subjecting the solid product (II) obtained by reacting the solid product (I) with TiCl₄ or with an organoaluminum compound (A₁) and TiCl₄ to polymerization treatment at a multi-stage with a linear olefin and a non-linear olefin, there is a polymerization treatment which is the same as that ① to ④ described in the present invention in the first aspect.

Further, the order of the polymerization treatment at a multi-stage with a linear olefin and a non-linear olefin is also the same as that described in the present invention in the first aspect. By this polymerization treatment at a multi-stage, a linear olefin-non-linear olefin block copolymer is formed, and the solid product (II) is in a state coated with the block copolymer.

Still further, the polymerization treatment may be carried out twice or more times as described above.

The conditions of the reaction of the reaction product (I) or an organoaluminum compound (A₁) with TiCl₄ are the same as those described in the present invention in the first aspect.

If the content of the non-linear olefin polymer block in the titanium trichloride composition (III) is less than 0.01% by weight, the stereoregularity of the resulting polypropylene and the effect of improving the transparency of a molded product obtained therefrom are both insufficient, while if it exceeds 49.5% by weight, improvement in the effect is not notable, resulting in operational and economical disadvantages.

Further, the ratio by weight of the linear olefin polymer block to the non-linear olefin polymer block is preferred to be 2/98 to 98/2 in the aspect of the balance among various effects, as in the case of the present invention in the first aspect.

The case where the multi-stage polymerization treatment with a linear olefin and a non-linear olefin is carried out by reacting (3) the reaction product (I) or an organoaluminum compound (A₁) with TiC₄, thereafter separating and removing the resulting liquid portion by filtering-off or decantation and suspending the resulting solid product (II) in a solvent, is also carried out in the same manner as in the present invention in the first aspect.

In any of the above multi-stage polymerization treatment, after completion of the respective multi-stage polymerization treatments with a linear olefin or a non-linear olefin, it is possible to use the resulting reaction mixture, as it is, to the subsequent polymerization treatment. Further, coexisting solvent, unreacted linear olefin or non-linear olefin, organoaluminum compound, etc. may be removed by filtering-off or decantation, followed by again adding a solvent and an organoaluminum compound and using the resulting mixture for the subsequent polymerization treatment with a non-linear olefin or a linear olefin.

The solvent used at the time of the polymerization treatment is the same as that described in the present invention in the first aspect.

After completion of the reaction, the resulting liquid portion may be separated and removed by filtering-off or decantation, followed by further repeating washing with a solvent and using the resulting solid product (hereinafter referred to often as solid product (II-A)) subjected to polymerization treatment, in a suspension state, as it is, or further drying it, taking out as a solid product and using at the subsequent step.

The solid product (II-A) is then reacted with an electron donor (B₂) and an electron acceptor (F). While this reaction may be carried out without using any solvent, use of an aliphatic hydrocarbon affords preferred results.

The used quantities, the reaction process, and the reaction conditions are the same as those described in the present invention in the first aspect.

After completion of the reaction of the solid product (II-A), (B₂) and (F), the resulting liquid portion is separated and removed by filtering-off or decantation, followed by further repeating washing with a solvent, to obtain a titanium trichloride composition (III) used for production of polypropylene of the present invention in the second aspect.

As the organoaluminum compound (A₁) used for the production of the titanium trichloride composition (III), an organoaluminum compound expressed by the formula

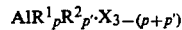

$$AlR^1_p R^2_{p'} \cdot X_{3-(p+p')}$$

wherein R¹ and R² each represent a hydrocarbon radical such as an alkyl group, a cycloalkyl group, an aryl group, etc. or an alkoxy group, X represents a halogen atom and p and p' each represent an optional number satisfying an expression of $0 < p+p' \leq 3$, is used.

Its concrete examples are the same as those described in the present invention in the first aspect.

As the electron donor used for producing the titanium trichloride composition (III), various compounds illustrated in the present invention in the first aspect may be used, but as (B₁) and (B₂), ethers are mainly used and other electron donors are preferred to be used together with ethers.

Compounds used for the electron donor and its using manner are the same as those described in the present invention in the first aspect.

The electron acceptor (F) used for producing the titanium trichloride composition (III) is represented by halogen compounds of elements belonging to groups III to VI of the Periodic Table. Concrete examples thereof are the same as those described in the present invention in the first aspect.

Compounds used for the solvent are the same as those described in the present invention in the first aspect.

The linear olefin used for the polymerization treatment, the non-linear olefin used for the polymerization treatment and concrete examples thereof are the same as those described in the present invention in the first aspect.

The thus obtained titanium trichloride composition (III) is combined with an organoaluminum compound (A$_2$) and an aromatic carboxylic acid ester (E) or an organosilicon compound (S) having Si—O—C bond and/or mercapto group in definite quantities mentioned below, to obtain a catalyst for producing polypropylene of the present invention in the second aspect, or preferably a preactivated catalyst is obtained by further reacting an olefin and used.

The process for the preactivation and the olefin used for the preactivation are the same as those in the present invention in the first aspect After completion of the preactivation reaction, a definite quantity of an aromatic carboxylic acid ester (E) or an organosilicon compound (S) having Si—O—C bond and/or mercapto group may be added to the preactivated catalyst component slurry and the resulting catalyst is used, as it is, for propylene polymerization, or coexisting solvent, unreacted olefin and organoaluminum compound may be removed by filtering-off or decantation, followed by drying to obtain powder or further adding a solvent to the powder to obtain a suspension and combining an aluminum compound (A$_2$) and (E) or (S) with the above powder or suspension to obtain a catalyst used for propylene polymerization, or coexisting solvent and unreacted olefin may be removed by vaporization by means of reduced pressure or inert gas current to obtain powder, or a solvent may be further added to the powder to obtain a suspension and if necessary, an organoaluminum compound (A$_2$) may be added to the suspension, followed by combining the mixture with (E) or (S) to obtain a catalyst for propylene polymerization.

As to the respective quantities of the titanium trichloride composition (III), the organoaluminum compound (A$_2$) and further the aromatic carboxylic acid ester (E) or the organosilicon compound (S) having Si—O—C bond and/or mercapto group, used at the time of propylene polymerization, when the aromatic carboxylic acid ester (E) is used as the third component of the catalyst, the quantities are used so as to give a molar ratio of the ester (E) to the composition (III) of 0.2 to 10.0, while when the organosilicon compound (S) having Si—O—C bond and/or mercapto group is used, the quantities are used so as to give a molar ratio of (S) to (III) of 1.5 to 10.0, and in either of the cases, the quantities are used so as to give a molar ratio of (A$_2$)/(III) of 0.2 to 200, preferably 0.2 to 100.

However, when the respective catalyst components are used within the above ranges of molar ratios, the highly stereoregular polypropylene of the present invention is not always obtained, but it is necessary to confirm the respective polymerization conditions (particularly, the polymerization temperature and concrete kinds of (E) or (S) used and the molar ratios of (E) or (S) to (III)).

Further, the number of mols of the titanium trichloride composition (III) refers to the number of Ti gram atoms substantially contained in (III).

The organoaluminum compound (A$_2$) combined with the titanium trichloride composition (III) at the time of propylene polymerization and its concrete examples are the same as those in the present invention in the first aspect.

Concrete examples of the aromatic carboxylic acid ester (E) used as the third component constituting the catalyst are the same as those described in the present invention in the first aspect.

Concrete examples of the organosilicon compound (S) having Si—O—C bond and/or mercapto group, usable as the third component in place of the aromatic carboxylic acid ester (E) are organosilicon compounds having Si—O—C bond such as methyltrimethoxysilane, vinyltrimethoxysilane, allyltrimethoxysilane, phenyltrimethoxysilane, dimethyldimethoxysilane, methylphenyldimethoxysilane, diphenyldimethoxysilane, trimethylmethoxysilane, triphenylmethoxysilane, tetraethoxysilane, methyltriethoxysilane, ethyltriethoxysilane, vinyltriethoxysilane, propyltriethoxysilane, allyltriethoxysilane, pentyltriethoxysilane, phenyltriethoxysilane, n-octyltriethoxysilane, n-octadecyltriethoxysilane, 6-triethoxysilane-2-norbornene, dimethyldiethoxysilane, diethyldiethoxysilane, diphenyldiethoxysilane, trimethylethoxysilane, triethylethoxysilane, triphenylethoxysilane, allyloxytrimethylsilane, methyltri-i-propoxysilane, dimethyldi-i-propoxysilane, trimethyl-i-propoxysilane, tetra-n-butoxysilane, methyltri-n-butoxysilane, tetra(2-ethylbutoxy)silane, methyltriphenoxysilane, dimethyldiphenoxysilane, trimethylphenoxysilane, trimethoxysilane, triethoxysilane, triethoxychlorosilane, tri-i-propoxychlorosilane, tri-n-butoxychlorosilane, tetracetoxysilane, methyltriacetoxysilane, ethyltriacetoxysilane, vinyltriacetoxysilane, methyldiacetoxysilane, diacetoxydimethylvinylsilane, dimethyldiacetoxysilane, methylphenyldiacetoxysilane, diphenyldiacetoxysilane, trimethylacetoxysilane, triethylacetoxysilane, phenyldimethylacetoxysilane, triphenylacetoxysilane, bis(trimethylsilyl)adipate, trimethylsilyl benzoate, triethylsilyl benzoate, etc.; organosilicon compounds having mercapto group such as mercaptomethyltrimethylsilane, 2-mercaptoethyltrimethylsilane, 3-mercaptopropyltrimethylsilane, 4-mercapto-n-butyltrimethylsilane, mercaptomethyltriethylsilane, 2-mercaptoethyltriethylsilane, 3-mercaptopropyltriethylsilane, 1-mercaptoethyltrimethylsilane, 3-mercaptopropyldimethylphenylsilane, 3-mercaptopropylethylmethylphenylsilane, 4-mercaptobutyldiethylphenylsilane, 3-mercaptopropylmethyldiphenylsilane, etc.; organosilicon compounds having Si—O—C bond and mercapto group such as mercaptomethyltrimethoxysilane, mercaptomethyldimethylmethoxymethylsilane mercaptomethyldimethoxymethylsilane, mercaptomethyltriethoxysilane, mercaptomethyldiethoxymethylsilane, mercaptomethyldimethylethoxysilane, 2-mercaptoethyltrimethoxysilane, 3-mercaptopropyltrimethoxysilane, dimethoxy-3-mercaptopropylmethylsilane, 3-mercaptopropyltriethoxysilane, diethoxy-3-mercaptopropylmethylsilane, mercaptomethyldimethyl-2-phenylethoxysilane, 2-mercaptoethoxytrimethylsilane, 3-mercaptopropoxytrimethylsilane, etc.; and organosilicon compounds having Si—O—C bond and amino group such as 3-aminopropyltrimethoxysilane, 3-aminopropyltriethoxysilane, 3-aminopropyldiethoxymethylsilane, 3-aminopropyldimethylethoxysilane, 3-aminophenoxydimethylvinylsilane, 4-aminophenoxydimethylvinylsilane, 2-aminoethylaminomethyltrimethoxysilane, 3-(2-aminoethylaminopropyl)dimethoxymethylsilane, 2-aminoethylaminomethylbenzyloxydimethylsilane, 3-[2-(2-aminoethylaminoethylamino)propyl]trimethoxysilane, etc.

Propylene polymerization is carried out using the thus combined catalyst or a preactivated catalyst therefrom.

As to the polymerization form of propylene polymerization, slurry polymerization carried out in a hydrocarbon solvent such as n-hexane, n-heptane, n-octane, benzene, toluene, etc., bulk polymerization carried out in liquefied propylene and gas phase polymerization carried out in gas phase are mentioned, and among these, slurry polymerization is mot preferred.

The polymerization temperature is preferred to be a relatively low temperature, that is, usually 20° to 75° C., preferably 40° to 65° C. and particularly preferably 40° to 60° C. If the polymerization temperature is too high, it is difficult to enhance the stereo-regularity of the resulting polypropylene, while if it is too low, the polymerization rate of propylene is low and hence not practical. The polymerization is carried out under a pressure of the atmospheric pressure (0 Kgf/cm$^2$G) to 50 Kgf/cm$^2$G, and usually for a polymerization time of about 30 minutes to 15 hours. Addition of an adequate quantity of hydrogen for molecular weight adjustment, and the like at the time of polymerization are the same as those in the case of conventional polymerization process of propylene.

In addition, either of batch polymerization and continuous polymerization may be employed. After completion of polymerization, known post-treatment processes such as catalyst-deactivating process, catalyst residue-removing process, etc. are carried out to obtain the highly stereoregular polypropylene of the present invention.

The polypropylene of the present invention in the second aspect, obtained according to the above-mentioned novel process is a novel polypropylene provided with both of a broad molecular weight distribution and a high stereoregularity, and if necessary, adequate quantities of stabilizers and additives such as heat-stabilizer, antioxidant, UV-absorber, anti-blocking agent, coloring agent, etc. and further, nucleus-creating agent, inorganic filler, various synthetic resins are blended, and further, if necessary, the polypropylene is pelletized, followed by known injection molding, extrusion molding, blow molding, etc. to obtain various molded products.

FUNCTION

Since the polypropylene of the present invention in the second aspect has a very high stereoregularity, the molded product obtained using the polypropylene of the present invention is far superior in the heat resistance, stiffness and strength. Further since it has a broad high molecular weight, it has a very high durability. Still further, since the molded product has a high crystallinity and exhibits a minute spherulite form, it has a superior transparency.

The characteristic physical properties of the polypropylene of the present invention affecting the superior properties of the molded product obtained using the polypropylene are described above, but as to the function in the aspect of the production of the present invention, supporting the above characteristic physical properties, the details of the function have not yet been clarified, but are presumed as follows:

The titanium trichloride composition (III) used in the production of the polypropylene of the present invention in the second aspect is provided with a capability of producing a polypropylene having a higher isotactic pentad ratio than that of conventional known titanium trichloride composition, as seen from Examples described below, and this is due to the fact that the linear olefin-non-linear olefin block copolymer, particularly the non-linear olefin polymer block therein affords a high stereoregularity upon the polymerization active centers.

Further, the aromatic carboxylic acid ester (E) or the organosilicon compound (S) having Si—O—C bond and/or mercapto group as the third component of the catalyst used in the production of the polypropylene of the present invention in the second aspect affords a broad molecular weight distribution and a high stereoregularity upon the polypropylene of the present invention.

Still further, the afore-mentioned linear olefin-non-linear olefin block copolymer originated from the titanium trichloride composition (III) of the present invention is dispersed in the polypropylene of the present invention in the second aspect, and since the linear olefin polymer block of the block copolymer is compatible with the polypropylene, the non-linear olefin polymer block also accordingly has a highly improved dispersibility in the polypropylene. Thus, since the nucleus-creating function of the non-linear olefin polymer block is notably exhibited, it is presumed that the molded product produced using the resulting polypropylene has a high crystallinity and a minute spherulite form so that it has a superior transparency.

EXAMPLE

The present invention will be described in more detail by way of Examples. The definitions of the terms and the measurement methods employed in Examples and Comparative examples are as follows:

(1) TY: polymerization activity i.e. polymer yield (unit: Kg/gram atom) per gram atom of Ti.

(2) MFR: melt flow rate according to JIS K 7210, Table 1, condition 14 ( unit: g/10 min. )

(3) Isotactic pentad ratio (P): measured based upon Macromolecules 8 687 (1975), that is, isotactic ratio in terms of pentad units in polypropylene molecular chain, measured using $^{13}$C—NMR.

(4) Inside haze: a haze inside a film, having removed the effect of its surface; measured by making up a polypropylene into a film of 150 $\mu$ thick by means of a press under conditions of a temperature of 200° C. and a pressure of 200 Kg/cm$^2$G, followed by coating liquid paraffin onto both the surfaces of the film and measuring the haze according to JIS K 7105. (Unit: %)

(5) Crystallization temperature: measured using a differential scanning calorimeter at a lowering rate of 10° C./min.

(6) Stiffness, strength and heat resistance:

Tetrakis[methylene-3-(3',5'-di-t-butyl-4'-hydroxyphenyl)propionate] methane (0.1 part by weight) and calcium stearate (0.1 part by weight) were mixed with polypropylene (100 parts by weight), followed by granulating the mixture by means of an extrusion-granulator having a screw of 40 mm in bore diameter, making up the resulting granules by means of an injection molding machine at a melt resin temperature of 230° C. and at a mold temperature of 50° C., into a test piece of JIS type, allowing the test piece to stand for 72 hours in a room of a humidity of 50% and room temperature (23° C.) and then measuring the stiffness, strength and heat resistance according to the following methods:

① Flexural elastic modulus: measured according to JIS K 7203, at 23° C. (Unit: Kgf/cm$^2$)

② Tensile strength: measured according to JIS K 7113, at 23° C. (Unit: Kgf/cm$^2$).

③ Heat deformation temperature: measured according to JIS K 7202.(Unit: °C.)

(7) Void: Polypropylene was granulated in the same manner as in the above item (6), followed by extruding the resulting granules by means of a T-die type film-making machine at a molten resin temperature of 250° C., preparing a sheet of 1 mm thick by means of a cooling roll at 20° C., heating the sheet with a hot air at 150° C. for 70 minutes, stretching it by means of a twinscrew stretching machine in the longitudinal and lateral directions, to 7 times the respective lengths in these directions to obtain a biaxially stretched film of 20 μ thick, and observing the film by means of an optical microscope to measure the number of voids of 10 μ or larger in diameter, 10 or less of the voids per cm$^2$ being designated as 0, 10 to 30 voids being designated as Δ and 30 or more voids being designated as x.

(8) Weight average molecular weight and weight average molecular weight/number average molecular weight (Q):

measured according to gel permeation chromatography using a device of GPC-150 C type manufactured by Waters Co., Ltd. to seek the above values.

(9) Melting point: measured by means of a differential scanning calorimeter of 1090 type manufactured by Dupont Co., Ltd., that is, under conditions of keeping a sample at 230° C. for 10 minutes, lowering the temperature down to −60° C. at a rate of −20° C./min., keeping it at the same temperature for 10 minutes and raising the temperature at a rate of 20° C./min. (Unit: °C.).

(10) Durability: A test piece was prepared in the same manner as in the above item (5), followed by subjecting it to tensile creep test (load: 248 Kgf/cm$^2$) according to JIS K 7115 and measuring the creep rupture time. (Unit: hour).

EXAMPLE 1

(1) Preparation of titanium trichloride composition (III)

n-Hexane (6 l), diethylaluminum monochloride (DEAC) (5.0 mols) and diisoamyl ether (12.0 mols) were mixed at 25° C. for one minute, followed by reacting the mixture at the same temperature for 5 minutes to obtain a reaction solution (I) (molar ratio of diisoamyl ether/DEAC: 2.4).

TiCl$_4$ (40 mols) was placed in a reactor purged with nitrogen gas, followed by heating it to 35° C., dropwise adding thereto the total quantity of the above reaction solution (I) over 180 minutes, keeping the mixture at the same temperature for 60 minutes, raising the temperature up to 80° C., further reacting for one hour, cooling down to room temperature, removing the supernatant and 4 times repeating a procedure of adding n-hexane (20 l) and removing the supernatant by decantation to obtain a solid product (II).

The total quantity of this (II) was suspended in n-hexane (30 l), followed by adding diethylaluminum monochloride (400 g), adding propylene (1.5 Kg) at 30° C., subjecting the mixture to polymerization treatment at the same temperature for one hour, thereafter removing the supernatant by decantation, twice washing the resulting solids with n-hexane (30 l), successively adding n-hexane (30 l) and diethylaluminum monochloride (400 g), making the temperature 40° C., adding vinylcyclohexane (1.9 Kg), subjecting the mixture to polymerization treatment at 40° C. for 2 hours, thereafter removing the supernatant and 4 times repeating a procedure of adding n-hexane (30 l) and removing the supernatant by decantation to obtain a solid product (II-A) subjected to a multi-stage polymerization treatment with propylene and vinylcyclohexane.

The total quantity of this solid product was suspended in n-hexane (9 l), followed by adding TiCl$_4$ (3.5 Kg) to the suspension at room temperature over about 10 minutes, reacting the mixture at 80° C. for 30 minutes, further adding diisoamyl ether (1.6 Kg), reacting the mixture at 80° C. for one hour, thereafter 5 times repeating a procedure of removing the supernatant and drying under reduced pressure to obtain a titanium trichloride composition (III).

The content of the propylene polymer block in the resulting titanium trichloride composition (III) was 25.0% by weight, the content of the vinylcyclohexane polymer block therein was 25.0% by weight and the Ti content therein was 12.6% by weight.

(2) Preparation of a preactivated catalyst component

Into a 80 l capacity stainless reactor provided with slant blades and purged with nitrogen gas were added n-hexane (40 l), diethylaluminum monochloride (114 g) and the titanium trichloride composition (III) (1.8 Kg) obtained above in the item (1) at room temperature, followed by feeding ethylene (1.8 Nm$^3$) at 30° C. for 2 hours, reacting it (quantity of ethylene reacted per g of the titanium trichloride composition (III): 1.0 g), removing unreacted ethylene, washing with n-hexane, filtering and drying to obtain a preactivated catalyst component.

(3) Propylene polymerization

Into a 150 l capacity stainless polymerization vessel (L/D=4) provided with a stirrer and purged with nitrogen gas was fed a polypropylene powder having an MFR of 2.0 (3 0 Kg), followed by continuously feeding into the vessel through the same piping, a suspension obtained by adding n-hexane to the preactivated catalyst component obtained above in the item (2) so as to give a 4.0% by weight of n-hexane suspension, at a rate of 8.77 mg atom in terms of Ti atom hour and diethylaluminum monochloride and methyl p-toluylate so as to give a molar ratio of 7.0 and that of 1.0, respectively, each based on Ti atom.

Further, feeding hydrogen gas so as to keep its concentration in the gas phase of the polymerization vessel at 2.7% by volume, and also feeding propylene so as to give a total pressure of 23 Kg/cm$^2$G, gas phase polymerization of propylene was continuously carried out at 70° C. over 120 hours. During the polymerization, the resulting polymer was continuously withdrawn at a rate of 13.5 Kg/hr. so as to give a level of the polymer retained in the polymerization vessel, 45% by volumem. The withdrawn polymer was successively subjected to contact treatment with nitrogen gas containing 0.2% by volume of propylene oxide, at 100° C. for 30 minutes, followed by contact treatment with steam at 100° C. for 30 minutes and further drying with nitrogen gas at 100° C. to obtain polypropylene.

EXAMPLES 2 AND 3

Example 1 was repeated except that, in Example 1 (3), the respective catalyst components were fed so as to give hydrogen concentrations in the gas phase of the polymerization vessel, of 4.0% by volume (Example 2) and 9.7% by volume (Example 3) and so as to give a total pressure in the polymerization vessel, of 23 Kg/cm$^2$G, to obtain polypropylene.

COMPARATIVE EXAMPLE 1

(1) A titanium trichloride composition was obtained in the same manner as in Example 1 (1) except that the multi-stage polymerization of the solid product (II) with propylene and vinylcyclohexane was omitted, to prepare a solid product (II-A) corresponding to the solid product (II).

(2) A preactivated catalyst component was obtained in the same manner as in Example 1 (2) except that the titanium trichloride composition obtained above in the item (1) was used in place of the titanium trichloride composition (III).

(3) Polypropylene was obtained in the same manner as in Example 1 (3) except that the preactivated catalyst component obtained above in the item (2) was used as a preactivated catalyst component and the respective catalyst components were fed so as to give a total pressure in the polymerization vessel, of 23 Kg/cm$^2$G

COMPARATIVE EXAMPLES 2 AND 3

Polypropylene was obtained in the same manner as in Comparative example 1 except that, in Example 1 (3), the hydrogen concentration in the gas phase of the polymerization vessel was changed to 4.0% by volume (Comparative example 2) and 9.7% by volume (Comparative example 3).

COMPARATIVE EXAMPLE 4

In Example 1 (1), the polymerization treatment with vinylcyclohexane at the second step was omitted and propylene alone was reacted to obtain a titanium trichloride composition, and using this titanium trichloride composition, a preactivated catalyst component was prepared in the same manner as in Example 1 (2). Successively, Example 1 (3) was repeated except that the above preactivated catalyst component was used and the respective catalyst components were fed so as to give a total pressure in the polymerization vessel, of 23 Kg/cm$^2$G, to obtain polypropylene.

COMPARATIVE EXAMPLE 5

(1) A titanium trichloride composition was obtained in the same manner as in Example 1 (1).

(2) Into the reactor employed in Example 1 (2) were added n-hexane 20 l), diethylaluminum monochloride (28.5 g) and the titanium trichloride composition (III) (225 g) obtained above in the item (1) at room temperature, followed by adding vinylcyclohexane (190 g), reacting the mixture at 40° C. for 2 hours (the quantity of vinylcyclohexane reacted per g of the titanium trichloride composition: 0.5 g), thereafter removing the supernatant by decantation, twice washing the solids with n-hexane 20 l), successively adding n-hexane 20 l) and diethylaluminum monochloride (28.5 g), making the temperature 30° C., adding propylene (150 g), reacting it at 30° C. for one hour (the quantity of propylene reacted per g of the titanium trichloride composition: 0.5 g), successively removing the supernatant, washing the solids with n-hexane, filtering and drying to obtain a preactivated catalyst component.

(3) Propylene polymerization was carried out in the same manner as in Example 1 (3) except that the preactivated catalyst component obtained above in the item (2) was used as a preactivated catalyst component. As a result, the formed mass polymer clogged the withdrawing piping so that 6 hours after the start of the polymerization, propylene polymerization had to be stopped.

COMPARATIVE EXAMPLE 6

(1) Comparative example 1 (1) was repeated except that when the reaction solution (I) was reacted with TiCl$_4$, separately using a titanium trichloride composition (500 g) obtained in the same manner as in Comparative example 1 (1) and diethylaluminum monochloride (120 g) as catalyst, vinylcyclohexane (1.3 Kg) added into n-hexane (100 l) was polymerized at 60° C. for 2 hours, followed by washing with methanol, drying, milling the resulting vinylcyclohexane polymer (950 g) in a 10 l capacity vibration mill at room temperature for 5 hours and suspending the resulting material in the above TiCl$_4$, to obtain a titanium trichloride composition containing 33.3% by weight of the vinylcyclohexane polymer.

(2) A preactivated catalyst component was obtained in the same manner as in Example 1 (2) except that the titanium trichloride composition obtained above in the item (1) was used in place of the titanium trichloride composition (III).

(3) Propylene polymerization was carried out in the same manner as in Example 1 (3) except that the preactivated catalyst component obtained above in the item (2) was used as a preactivated catalyst component, to obtain polypropylene.

COMPARATIVE EXAMPLE 7

Into a reactor purged with nitrogen gas were n-hexane (4 l) and TiCl$_4$ (10 mols), followed by keeping the mixture at 0° C., dropwise adding a n-hexane solution (4 l) containing diethylaluminum monochloride (8 mols), raising the temperature up to 40° C., further reacting the mixture for one hour, adding vinylcyclohexane (1.9 Kg), subjecting the mixture to polymerization treatment at the same temperature for 2 hours, thereafter removing the supernatant, three times repeating a procedure of adding n-hexane (5 l) and removing by decantation, suspending the resulting solid product subjected to the polymerization treatment in n-hexane (9 l), successively adding TiCl$_4$ (3.5 Kg) at room temperature, reacting the mixture at 90° C. for one hour and thereafter washing with n-hexane, to obtain a titanium trichloride composition. Propylene polymerization was carried out in the same manner as in Comparative example 1 except that the titanium trichloride composition obtained above was used, to obtain polypropylene.

COMPARATIVE EXAMPLE 8

Comparative example 1 was repeated except that, in Comparative example 1 (3), methyl p-toluylate as a catalyst component was not used.

COMPARATIVE EXAMPLE 9 AND EXAMPLES 4 AND 5

In Example 1 (1), allyltrimethylsilane was used in place of vinylcyclohexane, and the quantities of propylene and allyltrimethylsilane used were varied to thereby obtain titanium trichloride compositions (III) having the polymer contents as shown in Table 1, followed by preparing preactivated catalyst components using the above titanium trichloride compositions in the same manner as in Example 1 (2). Successively, propylene polymerization was carried out in the same manner as in Example 1 (3) except that the above preactivated catalyst components were used and the respective catalyst components were fed so as to give a pressure inside the polymerization vessel, of 23 Kg/cm$^2$G.

COMPARATIVE EXAMPLES 10–12 AND EXAMPLES 6 AND 7

Polypropylenes were obtained in the same manner as in Example 1 except that, in Example 1 (1), the quantity of propylene used was changed to 750 g, and 3-methylbutene-1 (2.7 Kg) was used in place of vinylcyclohexane to carry out a multi-stage polymerization treatment, and in Example 1 (3), the molar ratio of methyl p-toluylate to Ti atom was varied as shown in Table 1 and the respective catalyst components were fed so as to give a total pressures in the polymerization vessel, of 23 Kg/cm$^2$G.

EXAMPLE 8 n-Heptane (4 l), diethylaluminum monochloride (5.0 mols), diisoamyl ether (9.0 mols) and di-n-butyl ether (5.0 mols) were reacted at 18° C. for 30 minutes, followed by dropwise dropping the resulting reaction solution into TiCl$_4$ (27.5 mols) at 40° C. over 300 minutes, keeping the mixture at the same temperature for 1.5 hour to react it, raising the temperature up to 65° C., reacting for one hour, removing the supernatant, 6 times repeating a procedure of adding n-hexane 20 l) and removing by decantation, suspending the resulting solid product (II) (1.8 Kg) in n-hexane (40 l), adding diethylaluminum monochloride (500 g), adding propylene (1.5 Kg) at 30° C. and reacting for one hour, to carry out the first step polymerization treatment.

After lapse of the reaction time, the supernatant was removed, followed by twice repeating a procedure of adding n-hexane 20 l) and removing by decantation, successively adding n-hexane (40 l) and diethylaluminum monochloride (500 g), adding 4,4-dimethylpentene-1 (3.0 Kg), reacting the mixture at 40° C. for 2 hours to carry out the second step polymerization treatment and thereby obtain a solid product (II-A) subjected to a multi-stage polymerization treatment with propylene and 4,4-dimethylpentene-1.

After the reaction, the supernatant was removed, followed by twice repeating a procedure of adding n-hexane 20 l) and removing by decantation, suspending the above solid product (II-A) subjected to polymerization treatment in n-hexane (7 l), adding TiCl$_4$ (1.8 Kg) and n-butyl ether (1.8 Kg), reacting the mixture at 60° C. for 3 hours, thereafter removing the supernatant, adding n-hexane 20 l), agitating for 5 minutes, allowing the resulting material to stand still, 3 times repeating a procedure of removing the supernatant and drying under reduced pressure to obtain a titanium trichloride composition (III). Propylene polymerization was carried out in the same manner as in Example 1 (2) and (3) except that the above titanium trichloride composition (III) was used.

COMPARATIVE EXAMPLE 13

Example 8 was repeated except that a titanium trichloride composition was obtained without the multi-stage polymerization treatment with propylene and 4,4-dimethylpentene-1 and the composition was used in place of the titanium trichloride composition (III), to obtain polypropylene.

EXAMPLE 9

(1) Preparation of titanium trichloride composition (III)

TiCl$_4$ (27.0 mols) was added to n-hexane (12 l), followed by cooling the mixture down to 1° C., further dropwise adding n-hexane (12.5 l) containing diethylaluminum monochloride (27.0 mols) at 1° C. over 4 hours, thereafter keeping the mixture at the same temperature for 15 minutes to react it, successively raising the temperature up to 65° C. over one hour and further reacting at the same temperature for one hour.

Next, the supernatant was removed, followed by 5 times repeating a procedure of adding n-hexane (10 l) and removing by decantation, suspending 1.8 Kg of the resulting solid product (II) (5.7 Kg) in n-hexane (50 l), adding diethylaluminum monochloride (350 g), further adding propylene (0.6 Kg) at 30° C. subjecting it to polymerization treatment at the same temperature for one hour, successively removing the supernatant by decantation, washing the resulting solids with n-hexane (50 l), adding n-hexane (50 l) and diethylaluminum monochloride (350 g), further adding p-trimethylsilylstyrene (6.9 Kg), subjecting the mixture to polymerization treatment at 40° C. for 2 hours, thereafter removing the supernatant, twice repeating a procedure of adding n-hexane (30 l) and removing by decantation, suspending the total quantity of the resulting solid product (II-A) subjected to polymerization treatment in n-hexane (11 l), adding diisoamyl ether (1.2. l) and ethyl benzoate (0.4 l), agitating the resulting suspension at 35° C. for one hour, 5 times washing with n-hexane (3 l), suspending the resulting treated solids in a n-hexane solution (6 ) of TiCl$_4$ (40% by volume) and SiCl$_4$ (10% by volume), raising the temperature of the resulting suspension up to 65° C., reacting it at the same temperature for 2 hours, thereafter three times washing the resulting solids each time with n-hexane (20 l) and drying under reduced pressure to obtain a titanium trichloride composition (III).

(2) Preparation of a preactivated catalyst component

Example 1 (2) was repeated except that the titanium trichloride composition (III) (1.8 Kg) obtained above in the item (1) was used in place of the titanium trichloride composition (III) in Example 1 (2), and propylene (1.3 Kg) was used in place of ethylene, to obtain a preactivated catalyst component.

(3) Propylene polymerization

Into a 200 l capacity polymerization vessel provided with a stirrer having two-stage turbine elements were continuously fed a 4.0% by weight n-hexane suspension of the preactivated catalyst component obtained above in the item (2), at a rate of 19.6 mg atom in terms of Ti atom/hr and diethylaluminum monochloride and methyl p-toluylate in molar ratios of 3.0 and 1.0 relative to Ti atom, through the same piping, and separately n-hexane at a rate of 21 Kg/hr. through a separate piping. On the other hand, feeding hydrogen so as to keep its concentration in the gas phase of the polymerization vessel at 2.9% by volume and feeding propylene so as to keep a total pressure of 10 Kg/cm$^2$G, slurry polymerizaton of propylene was continuously carried out for 120 hours.

During the polymerization period, the resulting polymer slurry was continuously withdrawn from the polymerization vessel so as to keep the level of the slurry inside the polymerization vessel at 75% by volume, into a 50 l capacity flash tank. The pressure was dropped in the flash tank and unreacted propylene and hydrogen were removed, while methanol was fed at a rate of 1 Kg/hr. and the catalyst was treated at 70° C., followed by neutralizing with a NaOH aqueous solution, washing the polymer with water, separating and drying to obtain polypropylene at a rate of 10 Kg/hr.

COMPARATIVE EXAMPLE 14

Example 9 was repeated except that the multi-stage polymerization treatment with propylene and p-trimethylsilylstyrene was not carried out to obtain a titanium trichloride composition corresponding to the solid product (II-A). Using this composition, slurry polymerization of propylene was carried out in the same manner as in Example 9.

EXAMPLE 10

(1) Example 1 (1) was repeated except that di-n-butylaluminum monochloride (4.0 mols) was used in place of diethylaluminum monochloride to obtain a reaction solution (I), followed by dropwise adding the solution to TiCl$_4$ at 45° C., and the first stage polymerization treatment was carried out using ethylene (950 Nl) in place of propylene, followed by removing unreacted ethylene, and without washing the reaction mixture, carrying out the second stage polymerization treatment using 2-methyl-4-fluorostyrene (7.6 Kg) in place of vinylcyclohexane, to obtain a titanium trichloride composition (III).

(2) Example 1 (2) was repeated except that the titanium trichloride composition (III) (1.8 Kg) obtained above in the item (1) was used as the titanium trichloride composition (III), to obtain a preactivated catalyst component.

(3) Example 1 (3) was repeated except that the preactivated catalyst component obtained above in the item (2) was used as the preactivated catalyst component, ethyl p-anisate was used as the aromatic carboxylic acid ester and an equimolecular mixture of diethylaluminum monoiodide with n-propylaluminum monochloride was used as the organoaluminum compound; the molar ratio of the organoaluminum compound to the titanium trichloride composition (III) was changed to 6.0; and the respective catalyst components were fed so as to keep the total pressure at 23 Kg/cm$^2$G, to obtain polypropylene.

COMPARATIVE EXAMPLE 15

Example 10 was repeated except that, in Example 10 (1), the multi-stage polymerization treatment with ethylene and 2-methyl-4-fluorostyrene was omitted, to obtain a titanium trichloride composition. Polypropylene was then obtained in the same manner as in Example 10.

The catalyst systems of Examples 1-10 and Comparative examples 1-15, the polymerization results and the evaluations results of the resulting polypropylenes are shown in the Table listed below.

TABLE 1

| Nos. of Example and Comparative ex. | Catalyst system | | | | | | |
|---|---|---|---|---|---|---|---|
| | Titanium trichloride composition | | | | | Organoaluminum Compound (A$_2$) | |
| | | Linear olefin polymer block | | Non-linear olefin polymer block | | | |
| | Kind (note 1) | Name of linear olefin | Content (wt. %) | Name of non-linear olefin | Content (wt. %) | Kind (note 2) | (A$_2$)/Ti mol ratio |
| Ex. 1 | (III) | Propylene | 25.0 | Vinylcyclohexane | 25.0 | DEAC | 7.0 |
| Ex. 2 | " | " | 25.0 | " | 25.0 | " | 7.0 |
| Ex. 3 | " | " | 25.0 | " | 25.0 | " | 7.0 |
| Com. ex. 1 | TTC | — | — | — | — | " | 7.0 |
| Com. ex. 2 | " | — | — | — | — | " | 7.0 |
| Com. ex. 3 | " | — | — | — | — | " | 7.0 |
| Com. ex. 4 | TTC | Propylene | 33.3 | — | — | " | 7.0 |
| Com. ex. 5 | TTC | (Note 4) | — | (Note 4) | — | " | 7.0 |
| Com. ex. 6 | TTC | — | — | (Note 5) | 33.3 | " | 7.0 |
| Com. ex. 7 | TTC | Propylene | 10.4 | Vinylcyclohexane | 9.6 | " | 7.0 |
| Com. ex. 8 | TTC | — | — | — | — | " | 7.0 |
| Com. ex. 9 | (III) | Propylene | 0.01 | Allyltrimethylsilane | 0.001 | DEAC | 7.0 |
| Ex. 4 | " | " | 49.3 | " | 1.5 | " | 7.0 |
| Ex. 5 | " | " | 4.8 | " | 47.6 | " | 7.0 |
| Com. ex. 10 | (III) | propylene | 12.5 | 3-Methylbutene-1 | 37.5 | DEAC | 7.0 |
| Com. ex. 11 | " | " | 12.5 | " | 37.5 | " | 7.0 |
| Ex. 6 | " | " | 12.5 | " | 37.5 | " | 7.0 |
| Ex. 7 | " | " | 12.5 | " | 37.5 | " | 7.0 |
| Com. ex. 12 | " | " | 12.5 | " | 37.5 | " | 7.0 |
| Ex. 8 | (III) | Propylene | 26.3 | 4,4-Dimethyl-pentene-1 | 21.1 | DEAC | 7.0 |
| Com. ex. 13 | TTC | — | — | — | — | " | 7.0 |
| Ex. 9 | (III) | Propylene | 10.0 | p-Trimethylsilyl-styrene | 40.0 | DEAC | 3.0 |
| Com. ex. 14 | TTC | — | — | — | — | " | 3.0 |
| Ex. 10 | (III) | Ethylene | 29.4 | 2-Methyl-4-fluoro-styrene | 11.8 | DEAI DPAC | 6.0 |
| Com. ex. 15 | TTC | — | — | — | — | " | 6.0 |

| Nos. of Example and Comparative ex. | Aromatic carboxylic acid ester (E) | | Polymerization results | | | Evaluation results | | | |
|---|---|---|---|---|---|---|---|---|---|
| | Kind (note 3) | (E)/Ti mol ratio | TY (Kg/g atom) | MFR (g/10 min) | Isotactic pentad ratio (P) | Flexural elastic modulus (Kgf/cm$^2$) | Crystallization temp. (°C.) | Inside haze (%) | Void |
| Ex. 1 | MPT | 1.0 | 1540 | 2.1 | 0.972 | 19200 | 132.4 | 1.6 | ○ |
| Ex. 2 | " | 1.0 | 1540 | 4.0 | 0.976 | 19700 | 132.5 | 1.6 | ○ |

TABLE 1-continued

| | | | | | | | | | |
|---|---|---|---|---|---|---|---|---|---|
| Ex. 3 | " | 1.0 | 1460 | 20.8 | 0.987 | 21400 | 132.6 | 1.5 | Not evaluated |
| Com. ex. 1 | " | 1.0 | 990 | 2.0 | 0.968 | 17000 | 122.4 | 12.0 | ○ |
| Com. ex. 2 | " | 1.0 | 1000 | 4.1 | 0.975 | 17500 | 122.5 | 11.5 | ○ |
| Com. ex. 3 | " | 1.0 | 930 | 21.0 | 0.984 | 18800 | 122.8 | 11.2 | Not evaluated |
| Com. ex. 4 | " | 1.0 | 1550 | 2.1 | 0.969 | 17000 | 122.5 | 12.0 | ○ |
| Com. ex. 5 | " | 1.0 | 590 | 1.5 | 0.969 | 18100 | 126.8 | 3.1 | × |
| Com. ex. 6 | " | 1.0 | 970 | 1.7 | 0.969 | 18100 | 126.6 | 3.3 | × |
| Com. ex. 7 | " | 1.0 | 250 | 1.9 | 0.956 | 14600 | 126.2 | 4.0 | Δ |
| Com. ex. 8 | — | — | 1760 | 8.0 | 0.947 | 14200 | 118.6 | 11.2 | Not evaluated |
| Com. ex. 9 | MPT | 1.0 | 1010 | 2.0 | 0.968 | 17100 | 122.8 | 11.3 | ○ |
| Ex. 4 | " | 1.0 | 1540 | 2.1 | 0.969 | 18000 | 130.4 | 3.0 | ○ |
| Ex. 5 | " | 1.0 | 1210 | 2.0 | 0.971 | 18900 | 132.1 | 1.4 | ○ |
| Com. ex. 10 | — | — | 2700 | 7.9 | 0.949 | 16400 | 130.5 | 1.5 | Not evaluated |
| Com. ex. 11 | MPT | 0.05 | 2650 | 6.5 | 0.957 | 16600 | 131.0 | 1.5 | Not evaluated |
| Ex. 6 | " | 0.5 | 2250 | 4.2 | 0.968 | 18200 | 131.5 | 1.5 | ○ |
| Ex. 7 | " | 2.0 | 1030 | 1.2 | 0.973 | 19100 | 131.8 | 1.6 | ○ |
| Com. ex. 12 | " | 15.0 | 130 | 0.3 | 0.946 | Not evaluated | 128.5 | 3.7 | × |
| Ex. 8 | MPT | 1.0 | 1350 | 1.9 | 0.969 | 18500 | 131.8 | 1.8 | ○ |
| Com. ex. 13 | " | 1.0 | 970 | 2.0 | 0.967 | 16800 | 122.5 | 12.0 | ○ |
| Ex. 9 | MPT | 1.0 | 510 | 1.7 | 0.969 | 18300 | 131.2 | 2.5 | ○ |
| Com. ex. 14 | " | 1.0 | 440 | 1.8 | 0.967 | 16800 | 122.3 | 12.2 | ○ |
| Ex. 10 | EPA | 1.0 | 1340 | 2.1 | 0.969 | 18400 | 130.7 | 2.9 | ○ |
| Com. ex. 15 | " | 1.0 | 840 | 2.2 | 0.968 | 16800 | 122.6 | 12.0 | ○ |

(Note 1)
(III): titanium trichloride composition (III), TTC: titanium trichloride composition other than titanium trichloride composition (III)
(Note 2)
DEAC: diethylaluminum monochloride, DEAI: diethylaluminum monoiodide, DPAC: di-n-propylaluminum monochloride
(Note 3)
MPT: methyl p-toluylate, EPA: ethyl p-anisate

EFFECTIVENESS OF THE INVENTION

The main effectiveness of the present invention in the first aspect consists in that a high-stiffness polypropylene, even when made up into film, having few occurrence of voids and a superior transparency is obtained stably without causing any operational problem.

As apparent from the above Examples, according to the process of the present invention in the first aspect, there is no problem in the aspect of production and a long-term, stabilized production is possible. Further, the film produced using the resulting polypropylene has an inside haze of 1.4 to 3.0% and hence has a far higher transparency than films produced using conventional polypropylenes obtained using a titanium trichloride composition containing no specified block copolymer or the polypropylene prepared according to the process of the prior application invention, either having an inside haze of about 11% to about 12%.

Further, the crystallization temperature, too, has been elevated by about 12° C. to about 14° C. as compared with conventional polypropylenes and by about 8° C. to about 10° C. as compared with the polypropylene obtained according to the process of the prior application invention, and as a result of such improved crystallinity, the flexural elastic modulus, too, has been improved (see Examples 1-10, Comparative examples 1-4, 8 and 13-15).

Whereas, according to conventional technique of introducing a non-linear olefin polymer according to a process other than the present invention in the first aspect, operational problems have occurred, and further problems have been raised that when the resulting polypropylene is made into a film, many voids occur, and since the dispersibility is inferior, improvements in the transparency and stiffness are insufficient (see Comparative examples 5 and 6).

EXAMPLE 11

(1) Preparation of titanium trichloride composition (III)

n-Hexane (6 ), diethylaluminum monochloride (DEAC) (5.0 mols) and diisoamyl ether (12.0 mols) were mixed at 25° C. for one minute, followed by reacting the mixture at the same temperature for 5 minutes to obtain a reaction solution (I) (molar ratio of diisoamyl ether/DEAC: 2.4).

TiCl$_4$ (40 mols) was placed in a reactor purged with nitrogen gas, followed by heating it to 35° C., dropwise adding thereto the total quantity of the above reaction liquid (I) over 180 minutes, keeping the mixture at the same temperature for 60 minutes, raising the temperature up to 80° C., further reacting for one hour, cooling down to room temperature, removing the supernatant, and 4 times repeating a procedure of adding n-hexane (20 l) and removing the supernatant by decantation to obtain a solid product (II).

The total quantity of this product (II) was suspended in n-hexane (30 l), followed by adding diethylaluminum monochloride (400 g), adding propylene (1.5 Kg) at 30° C., subjecting the mixture to polymerization treatment at the same temperature for one hour, thereafter removing the supernatant by decantation, twice washing the resulting solids with n-hexane (30 l), successively adding n-hexane (30 l) and diethylaluminum monochloride (400 g), making the temperature 40° C., adding vinylcyclohexane (1.9 Kg) and subjecting the mixture to polymerization treatment at 40° C. for 2 hours.

After completion of the reaction, the supernatant was removed, followed by 4 times repeating a procedure of adding n-hexane (30 l) and removing the supernatant by decantation to obtain a solid product (II-A) subjected to a multi-stage polymerization treatment with propylene and vinylcyclohexane.

The total quantity of this solid product was suspended in n-hexane (9 l), followed by adding TiCl$_4$ (3.5 Kg) to the suspension at room temperature over about 10 minutes, reacting the mixture at 80° C. for 30 minutes, further adding diisoamyl ether (1.6 Kg), reacting the mixture at 80° C. for one hour, thereafter 5 times repeating a procedure of removing the supernatant and drying under reduced pressure to obtain a titanium trichloride composition (III).

The content of a propylene polymer block in the titanium trichloride composition (III) was 25.0% by weight, the content of a vinylcyclohexane polymer block therein was 25.0% by weight and the Ti content therein was 12.6% by weight.

(2) Preparation of preactivated catalyst component

Into a 150 l capacity stainless reactor provided with a stirrer having slant blades and purged with nitrogen gas were a n-hexane (90 l), diethylaluminum monochloride (1.71 Kg) and the titanium trichloride composition (III) (1.8 Kg) obtained above in the item (1) at room temperature, followed by adding propylene (1 Kg), reacting at 30° C. over 2 hours (quantity of propylene reacted per g of the titanium trichloride composition (III): 0.5 g) and removing unreacted propylene to obtain a preactivated catalyst component in a slurry state.

(3) Production of polypropylene

Into a 150 l capacity polymerization vessel provided with a stirrer having two-stage turbine elements were continuously fed the preactivated catalyst component slurry (note: containing diethylaluminum monochloride) obtained above in the item (2) at a rate of 11.5 mg atom in terms of Ti atom/hr., and methyl p-toluylate so as to give a molar ratio of 1.8 relative to Ti atom, each as catalyst through the same piping and separately n-hexane at a rate of 13 Kg/hr. through a separate piping, followed by further feeding hydrogen gas so as to give its concentration in the gas phase of the polymerization vessel, of 11% by volume, and propylene so as to keep a total pressure of 10 Kg/cm$^2$G to continuously carry out slurry polymerization of propylene at 60° C. over 120 hours.

During the polymerization, the resulting polymer slurry was continuously withdrawn from the polymerization vessel so as to give the level of the polymer slurry retained within the polymerization vessel of 75% by volume, into a 50 l capacity flash tank, followed by dropping the pressure in the flash tank to remove unreacted hydrogen and propylene, while feeding methanol at a rate of 1 Kg/hr to carry out contact treatment at 70° C., successively neutralizing the polymer slurry with a NaOH aqueous solution, washing the polymer with water, separating and drying to obtain polypropylene at a rate of 10 Kg/hr.

As a result of analysis of the polypropylene, it had an MFR of 4.0 (g/10 min.), an isotactic pentad ratio (P) of 0.985, a weight average molecular weight/number average molecular weight (Q) of 13.5, a weight average molecular weight of 340,000 and a m.p. of 168.0° C.

COMPARATIVE EXAMPLE 16

(1) Example 11 (1) was repeated except that a product corresponding to the solid product (II-A) was obtained without subjecting the solid product (II) to a multi-stage polymerization treatment with propylene and vinylcyclohexane, to obtain a titanium trichloride composition.

(2) Example 11 (2) was repeated except that the titanium trichloride composition (0.9 Kg) obtained above in the item (1) was used in place of the titanium trichloride composition (III), to obtain a preactivated catalyst component.

(3) Propylene polymerization was carried out in the same manner as in Example 11 (3) except that the preactivated catalyst component obtained above in the item (2) was used as the preactivated catalyst component, and the respective catalyst components were fed to the polymerization vessel so as to keep the total pressure in the polymerization vessel at 10 Kg/cm$^2$G, to obtain polypropylene.

COMPARATIVE EXAMPLE 17

(1) In a stainless reactor provided with a stirrer were mixed decane (3 l), anhydrous MgCl$_2$ (480 g), n-butyl o-titanate (1.7 Kg) and 2-ethyl-1-hexanol (1.95 Kg), followed by heating and dissolving the mixture with stirring at 130° C. for one hour to obtain a uniform solution, lowering the temperature of the solution down to 70° C., adding diisobutyl phthalate (180 g) with stirring, after lapse of one hour dropwise adding SiCl$_4$ (5.2 Kg) over 2.5 hours to deposit solids, further heating at 70° C. for one hour, separating the solids from the solution and washing with hexane to obtain a solid product (III).

The total quantity of the solid product (III) was mixed with TiCl$_4$ (15 l) dissolved in 1,2-dichloroethane (15 l), followed by adding diisobutyl phthalate (360 g), reacting the mixture at 100° C. for 2 hours, removing the liquid phase portion by decantation at the same temperature, again adding 1,2-dichloroethane (15 g) and TiCl$_4$ (15 l), agitating the mixture at 100° C. for 2 hours, washing with hexane and drying to obtain a Ti-containing catalyst component of supported type.

(2) Into a 30 l capacity stainless reactor provided with slant blades and purged with nitrogen gas were added n-hexane (20 l), triethylaluminum (1.5 Kg), diphenyldimethoxysilane (480 g) and the Ti-containing catalyst component of supported type obtained above in the item (1) (100 g) at room temperature, followed by adding vinylcyclohexane (85 g) and reacting the mixture at 40° C. for 2 hours (the quantity of vinylcyclohexane reacted per g of the Ti-containing catalyst component of supported type: 0.5 g), to obtain a preactivated catalyst in a slurry state.

(3) Example 11 (3) was repeated except that the preactivated catalyst slurry (containing triethylaluminum and diphenyldimethoxysilane besides the preactivated, Ti-containing catalyst component of supported type) as catalyst obtained above in the item (1) was continuously fed a rate of 0.27 mg atom/hr. in terms of Ti atom, and the hydrogen concentration in the gas phase of the polymerization vessel was kept at 1.5% by volume, to carry out propylene polymerization. As a result, the resulting mass polymer clogged the polymer slurry-withdrawing piping from the polymerization vessel so that 6 hours after start of the polymerization, propylene polymerization had to be stopped.

COMPARATIVE EXAMPLE 18

(1) Comparative example 16 (1) was repeated except that when the reaction solution (I) was reacted with TiCl$_4$, separately, titanium trichloride composition (500 g) obtained in the same manner as in Comparative example 16 (1) and diethylaluminum monochloride (120 g) were used as catalyst, and vinylcyclohexane (1.3 Kg) added into n-hexane (100 l) was polymerized at 60° C. for 2 hours, followed by washing with methanol, drying, milling the resulting vinylcyclohexane polymer (950 g) in a 10 l capacity vibration mill at room temperature for 5 hours and suspending the resulting material in TiCl$_4$, to obtain a titanium trichloride composition containing 33.3% by weight of vinylcyclohexane polymer.

(2) Example 11 (2) was repeated except that the titanium trichloride composition (III) was replaced by the titanium trichloride composition (1.35 Kg) obtained above in the item (1), to obtain a preactivated catalyst component.

(3) Propylene polymerization was carried out in the same manner as in Example 11 (3) except that the preactivated catalyst component obtained above in the item (2) was used as the preactivated catalyst component and the respective catalyst components were fed to the polymerization vessel so as to keep the total pressure inside the polymerization vessel at 10 Kg/cm$^2$G, to obtain polypropylene.

COMPARATIVE EXAMPLE 19

Into a reactor purged with nitrogen gas were placed n-hexane (4 l) and TiCl$_4$ (10 mols), followed by keeping them at 0° C., dropwise adding n-hexane solution (4 l) containing diethylaluminum monochloride (8 mols), raising the temperature up to 40° C., further reacting for one hour, adding propylene (1.5 Kg), subjecting the mixture to polymerization treatment at the same temperature for 2 hours, thereafter removing the supernatant, twice washing the resulting solids with n-hexane (10 l), suspending them in n-hexane (8 l), successively adding diethylaluminum monochloride (300 g), adding vinylcyclohexane (1.9 Kg), subjecting the mixture to polymerization treatment at 40° C. for 2 hours, thereafter removing the supernatant, 3 times repeating a procedure of adding n-hexane (5 l) and removing by decantation, suspending the resulting solid product subjected to the multi-stage polymerization treatment in n-hexane (9 l), successively adding TiCl$_4$ (3.5 Kg) at room temperature, reacting the mixture at 90° C. for one hour, thereafter washing with n-hexane to obtain a titanium trichloride composition. Comparative example 16 was then repeated except that the above titanium trichloride composition was used, to obtain polypropylene.

COMPARATIVE EXAMPLE 20

Propylene polymerization was carried out in the same manner as in Example 11 (3) except that a preactivated catalyst component slurry was fed into a polymerization vessel so as to keep the total pressure inside the polymerization vessel at 10 Kg/cm$^2$G, without feeding methyl p-toluylate as the third component, and the hydrogen concentration in the gas phase of the polymerization vessel was made 5.2% by volume, to obtain polypropylene.

COMPARATIVE EXAMPLE 21

Propylene polymerization was carried out in the same manner as in Example 15 except that the preactivated catalyst component slurry obtained in the same manner as in Comparative example 16 (2) was used as the preactivated catalyst component slurry, to obtain polypropylene.

EXAMPLES 12 AND 13

Propylene polymerization was carried out in the same manner as in Example 11 (3) except that the hydrogen concentration inside the polymerization vessel was made 3.2% by volume (Example 12) and 18% by volume (Example 13), and the respective catalyst components were fed so as to keep the total pressure inside the polymerization vessel at 10 Kg/cm$^2$G, to obtain polypropylenes.

EXAMPLE 14

(1) Preparation of titanium trichloride composition (III)

n-Heptane (4 l), diethylaluminum monochloride (5.0 mols), diisoamyl ether (9.0 mols) and di-n-butyl ether (5.0 mols) were reacted at 18° C. for 30 minutes, followed by dropwise adding the resulting reaction solution into TiCl$_4$ (27.5 mols) at 40° C. over 300 minutes, reacting the mixture at the same temperature for 1.5 hour, raising the temperature up to 65° C., reacting for one hour, removing the supernatant, 6 times repeating a procedure of adding n-hexane (20 l) and removing by decantation, suspending the resulting solid product (II) (1.8 Kg) in n-hexane (40 l), adding diethylaluminum monochloride (500 g), adding propylene (1.5 Kg) at 30° C. and reacting the mixture for one hour to carry out a first stage polymerization treatment.

After lapse of the reaction time, the supernatant was removed, followed by twice repeating a procedure of adding n-hexane (20 l) and removing by decantation, successively adding n-hexane (40 l) and diethylaluminum monochloride (500 g), adding allyltrimethylsilane (3.0 Kg), reacting the mixture at 40° C. for 2 hours to carry out a second stage polymerization treatment and thereby obtain a solid product (II-A) subjected to the multi-stage polymerization treatment with propylene and allyltrimethylsilane.

After the reaction, the supernatant was removed, followed by twice repeating a procedure of adding n-hexane (20 l) and removing by decantation, suspending the above solid product (II-A) subjected to the polymerization treatment in n-hexane (7 l), adding TiCl$_4$ (1.8 Kg) and n-butyl ether (1.8 Kg), reacting the mixture at 60° C. for 3 hours, thereafter removing the supernatant by decantation, 3 times repeating a procedure of adding n-hexane (20 l), agitating the mixture for 5 minutes, allowing it to stand still and removing the supernatant, and drying under reduced pressure, to obtain a titanium trichloride composition (III).

(2) Preparation of preactivated catalyst component

Example 11 (2) was repeated except that the titanium trichloride composition obtained above in the item (1) was used as the titanium trichloride composition (III), to obtain a preactivated catalyst component slurry.

(3) Production of polypropylene

Propylene polymerization was carried out in the same manner as in Example 11 (3) except that the preactivated catalyst component slurry obtained above in the item (2) was used as the preactivated catalyst component slurry, the respective catalyst components were fed so as to keep the total pressure in the polymerization vessel at 10 Kg/cm$^2$G and the hydrogen concentration in the gas phase of the polymerization vessel was made 7% by volume, to obtain polypropylene. This polypropylene had an MFR of 2.0 (g/10 min.), an isotactic pentad ratio of 0.981, a weight average molecular weight/number average molecular weight (Q) of 12.0, a weight average molecular weight of 410,000 and an m.p. of 167.5° C.

EXAMPLE 15

(1) Preparation of titanium trichloride composition (III)

TiCl$_4$ (27.0 mols) was added to n-hexane (12 l), followed by cooling the mixture down to 1° C., dropwise n-hexane (12.5 l) containing diethylaluminum monochloride (27.0 mols) at 1° C. over 4 hours, thereafter keeping the same temperature for 15 minutes for reaction, raising the temperature up to 65° C. over one hour and further reacting at the same temperature for one hour.

Next, the supernatant was removed, followed by 5 times repeating a procedure of adding n-hexane (10 l) and removing by decantation, suspending 1.8 Kg of the resulting solid product (II) (5.7 Kg) in n-hexane (50 l), adding diethylaluminum monochloride (350 g), further adding propylene (0.6 Kg) at 30° C. and subjecting the mixture to polymerization treatment at the same temperature for one hour.

Successively, the supernatant was removed by decantation, followed by washing the resulting solids with n-hexane (50 l), adding n-hexane (50 l) and diethylaluminum monochloride (350 g), further adding 3-methylbutene-1 (1.9 Kg) and subjecting the mixture to polymerization treatment at 40° C. for 2 hours.

After the treatment, the supernatant was removed, followed by twice repeating a procedure of adding n-hexane (30 l) and removing by decantation, suspending the total quantity of the resulting solid product (II-A) subjected to the multi-stage polymerization treatment in n-hexane (11 l), adding diisoamyl ether (1.2 l) and ethyl benzoate (0.4 l), agitating the resulting suspension at 35° C. for one hour, 5 times washing with n-hexane (3 l) to obtain treated solids, and suspending the solids in n-hexane solution (6 l) containing TiCl$_4$ (40% by mol) and SiCl$_4$ (10% by volume).

The temperature of the resulting suspension was raised up to 65° C., followed by reacting it at the same temperature for 2 hours, thereafter three times washing the solids with n-hexane, each time in 20 l, and drying under reduced pressure to obtain a titanium trichloride composition (III).

(2) Preparation of preactivated catalyst component

Example 11 (2) was repeated except that the titanium trichloride composition obtained above in the item (1) was used as the titanium trichloride composition (III), and a mixture of diethylaluminum monochloride (1.2 Kg) with diethylaluminum monoidode (0.9 Kg) was used as the organoaluminum compound, to obtain a preactivated catalyst in a slurry state.

(3) Production of polypropylene

Propylene polymerization was carried out in the same manner as in Example 11 (3) except that the preactivated catalyst component slurry obtained above in the item (2) (note: containing diethylaluminum monochloride and diethylaluminum monoiodide) was fed to the polymerization vessel at a rate of 22.2 mg atom in terms of Ti atom/hr. as the preactivated catalyst component; 3-aminopropyltriethoxysilane was fed to the polymerization vessel in place of methyl p-toluylate as a third component of catalyst so as to give a molar ratio thereof to Ti atom of 2.8; and the hydrogen concentration in the gas phase of the polymerization vessel was kept at 28% by volume, to obtain polypropylene. This polypropylene has an MFR of 30.0 (g/10 min.), an isotactic pentad ratio (P) of 0.980, a weight average molecular weight/a number average molecular weight (Q) of 13.0, a weight average molecular weight of 190,000 and an m.p. of 166.8° C.

COMPARATIVE EXAMPLE 22

(1) Example 15 (1) was repeated except that a product corresponding to the solid product (II-A) was prepared without subjecting the solid product (II) to polymerization treatment with propylene and 3-methylbutene-1, to obtain a titanium trichloride composition.

(2) Example 11 (2) was repeated except that the titanium trichloride composition (1.1 Kg) was used, to obtain a preactivated catalyst component slurry.

(3) Propylene polymerization was carried out in the same manner as in Example 11 (3) except that the preactivated catalyst component slurry obtained above in the item (2) was used as the preactivated catalyst component slurry and the respective catalyst components were fed so as to give the total pressure in the polymerization vessel at 10 Kg/cm$^2$G, to obtain polypropylene.

The catalyst conditions, the polypropylene physical properties and the evaluation results in the above Examples and Comparative examples are collectively shown in the following Table 2:

TABLE 2

| Nos. of Example and Comparative example | Ti-containing solid catalyst component | | | | | Organoaluminum compound (A$_2$) | | Third component | |
|---|---|---|---|---|---|---|---|---|---|
| | Kind (Note 1) | First stage polymerization treatment | | Second stage polymerization treatment | | Kind (Note 3) | (A$_2$)/Ti Molar ratio | Kind (Note 4) | (E)/Ti or (S)/Ti Molar ratio |
| | | Name of monomer | Content (wt. %) | Name of monomer (Note 2) | Content (wt. %) | | | | |
| Ex. 11 | (III) | Propylene | 25.0 | VCH | 25.0 | DEAC | 3.0 | MPT | 1.8 |
| Com. ex. 16 | TTC | — | — | — | — | " | 3.0 | " | 1.8 |
| Com. ex. 17 | STC | — | — | (Note 5) | — | TEA | 209.8 | DPDMS | 31.4 |
| Com. ex. 18 | TTC | — | — | (Note 6) | (33.3) | DEAC | 3.0 | MPT | 1.8 |
| Com. ex. 19 | TTC | Propylene | 10.4 | VCH | 9.6 | " | 2.0 | " | 1.8 |
| Com. ex. 20 | (III) | " | 25.0 | " | 25.0 | " | 3.0 | — | — |
| Com. ex. 21 | TTC | — | — | — | — | " | 3.0 | — | — |
| Ex. 12 | (III) | Propylene | 25.0 | VCH | 25.0 | " | 3.0 | MPT | 1.8 |
| Ex. 13 | " | " | 25.0 | " | 25.0 | " | 3.0 | " | 1.8 |
| Ex. 14 | (III) | Propylene | 26.3 | ATMS | 21.1 | DEAC | 2.8 | MPT | 1.8 |
| Ex. 15 | (III) | Propylene | 11.8 | 3MB1 | 29.4 | DEAC DEAI | 2.4 | APTES | 2.8 |
| Com. ex. 22 | TTC | — | — | — | — | " | 2.4 | " | 2.8 |

| Nos. of Example and Comparative example | Physical properties of polypropylene | | | | | Evaluation results | | | | |
|---|---|---|---|---|---|---|---|---|---|---|
| | MFR (g/10 min.) | Isotactic pentad ratio (P) | Weight average MW/ number average MW (Q) | Weight average MW | M.P. (°C.) | Flexural elastic modulus | | Tensile Strength (kgf/cm$^2$) | Heat distortion temp. (°C.) | Tensile creep breakage time (hr.) | Inside haze (%) |
| | | | | | | 23° C. (kgf/cm$^2$) | 80° C. (kgf/cm$^2$) | | | | |
| Ex. 11 | 4.0 | 0.985 | 13.5 | 340,000 | 168.0 | 22800 | 7300 | 425 | 136 | 73 | 1.9 |
| Com. ex. 16 | 4.0 | 0.972 | 10.6 | 340,000 | 165.6 | 21000 | 5300 | 412 | 133 | 69 | 12.5 |
| Com. ex. 17 | 4.0 | 0.960 | 4.5 | 320,000 | 164.0 | 14000 | 4700 | 360 | 127 | 27 | 4.0 |

TABLE 2-continued

| | | | | | | | | | | | |
|---|---|---|---|---|---|---|---|---|---|---|---|
| Com. ex. 18 | 3.9 | 0.973 | 10.4 | 340,000 | 165.9 | 21400 | 5400 | 410 | 134 | 70 | 5.0 |
| Com. ex. 19 | 3.8 | 0.958 | 5.8 | 320,000 | 162.2 | 14800 | 4500 | 360 | 128 | 21 | 4.0 |
| Com. ex. 20 | 4.0 | 0.967 | 6.0 | 320,000 | 165.2 | 16900 | 6300 | 385 | 131 | 29 | 1.8 |
| Com. ex. 21 | 4.2 | 0.950 | 5.5 | 320,000 | 162.5 | 13900 | 4300 | 360 | 127 | 23 | 11.3 |
| Ex. 12 | 0.5 | 0.984 | 13.1 | 610,000 | 167.8 | 20700 | 6800 | 410 | 133 | 76 | 2.0 |
| Ex. 13 | 10.0 | 0.987 | 14.0 | 260,000 | 168.1 | 23800 | 7500 | 422 | 137 | 70 | 1.8 |
| Ex. 14 | 2.0 | 0.981 | 12.0 | 410,000 | 167.5 | 22100 | 6900 | 420 | 134 | 70 | 1.9 |
| Ex. 15 | 30.0 | 0.980 | 13.0 | 190,000 | 166.8 | 23500 | 6800 | 428 | 134 | 68 | 2.4 |
| Com. ex. 22 | 29.5 | 0.969 | 10.0 | 190,000 | 165.1 | 21100 | 5200 | 408 | 132 | 66 | 13.0 |

(Note 1)
(III): titanium trichloride composition (III), TTC: titanium trichloride composition other than (III), STC: Ti-containing, supported type catalyst component.
(Note 2)
VCH: vinylcyclohexane, ATMS: allyltrimethylsilane, 3MB1: 3-methylbutene-1.
(Note 3)
DEAC: diethylaluminum monochloride, DEAI: diethylaluminum monoiodide.
(Note 4)
MPT: methyl p-toluylate, DPDMS: diphenyldimethoxysilane, APTES: 3-aminopropyltriethoxysilane.
(Note 5)
Ti-containing, supported type catalyst component was preactivated with vinylcyclohexane.
(Note 6)
At the time of preparation of titanium trichloride composition, vinylcyclohexane separately obtained by polymerization was added.

EFFECTIVENESS OF THE INVENTION

As apparent from the above Examples, the polypropylene of the present invention in the second aspect has a high stereoregularity, a broad molecular weight distribution and a minute spherulite form as never seen in the case of conventional polypropylenes; hence molded products prepared therefrom have a far higher stiffness, strength, heat resistance, durability and transparency as compared with molded products prepared from conventional polypropylenes.

Thus, the molded products prepared using the polypropylene of the present invention in the second aspect according to various molding processes can be expected to use as far as fields of use applications to which the molded products prepared from conventional polypropylenes could not have been applied.

What we claim is:

1. A process for producing a high-stiffness polypropylene which comprises polymerizing propylene using a catalyst obtained by combining
   ① a titanium trichloride composition (III) obtained by reacting $TiCl_4$ with an organoaluminum compound ($A_1$) or a reaction product (I) of an organoaluminum compound ($A_1$) with an electron donor ($B_1$) to obtain a solid product (II), followed by subjecting said solid product (II) to a multi-stage polymerization treatment with a linear olefin and a non-linear olefin, each once or more times used, to form a linear olefin-non-linear olefin block copolymer in a ratio by weight of a linear olefin polymer block therein to a non-linear olefin polymer block therein of 2/98 to 98/2, followed by further reacting said block copolymer with an electron donor ($B_2$) and an electron acceptor to obtain said titanium trichloride composition (III), which contains 0.1 to 49.5% by weight of said linear olefin polymer block and 0.01 to 49.5% by weight of said non-linear olefin polymer block;
   ② an organoaluminum compound ($A_2$); and
   ③ an aromatic carboxylic acid ester (E),
   the molar ratio of said aromatic carboxylic acid ester (E) to said titanium trichloride composition (III), that is, (E)/(III) being made 0.1 to 10.0, and the molar ratio of said organoaluminum compound ($A_2$) to said titanium trichloride composition (III), that is, ($A_2$)/(III) being made 0.1 to 200.

2. A production process according to claim 1 wherein said organoaluminum compound ($A_1$) is expressed by the formula $AlR^1_p R^2_{p'} X_{3-(p+p')}$ wherein $R^1$ and $R^2$ each represent a hydrocarbon radical selected from an alkyl group, a cycloalkyl group or an aryl group or an alkoxy group, X represents a halogen atom and p and p' each represent an optional number satisfying an expression of $0 < p + p' \leq 3 =$. 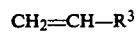

3. A production process according to claim 1 wherein said non-linear olefin is a saturated ring-containing hydrocarbon monomer expressed by the formula $$CH_2=CH-R^3$$

wherein $R^3$ represents a saturated ring-containing hydrocarbon radical of 3 to 18 carbon atoms having a saturated ring structure of a hydrocarbon, which structure may contain silicon atom and which radical may contain silicon atom.

4. A production process according to claim 1, wherein said non-linear olefin is a branched olefin expressed by the formula

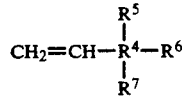

wherein $R^4$ represents a chain hydrocarbon radical of 1 to 3 carbon atoms which may contain silicon atom or silicon atom, $R^5$, $R^6$ and $R^7$ each represent a chian hydrocarbon radical of 1 to 6 carbon atoms which may contain silicon atom, but any one of $R^5$, $R^6$ and $R^7$ may be hydrogen atom.

5. A production process according to claim 1, wherein said non-linear olefin is an aromatic monomer expressed by the formula

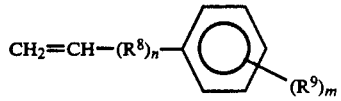

wherein n represents 0 or 1, m represents 1 or 2, $R^8$ represents a chain hydrocarbon radical of 1 to 6 carbon atoms which may contain silicon atom and $R^9$ represents a hydrocarbon radical of 1 to 12 carbon atoms which may contain silicon atom, hydrogen atom or a halogen atom, and in the case of m=2, the respective $R^9$s may be same or different.

6. A production process according to claim 1, wherein said organoaluminum compound (A$_2$) is a dialkylaluminum monohalide.

7. A production process according to claim 1, wherein a preactivated catalyst component obtained by combining said titanium trichloride composition(III) with an organoaluminum compound, followed by reacting a small quantity of an olefin with the resulting combination is used in place of said titanium trichloride composition(III).

8. A production process according to claim 1, wherein the relationship between the isotactic pentad ratio (P) and the melt flow rate (MFR) of the resulting polypropylene satisfies the following expression:

$$1.00 \geq P \geq 0.015 \log MFR + 0.955.$$

9. A process for producing a highly stereoregular polypropylene by polymerizing propylene using a catalyst obtained by combining
  (1) a titanium trichloride composition (III) obtained by reacting TiCl$_4$ with an organoaluminum compound (A$_1$) or a reaction product (I) of an organoaluminum compound (A$_1$) with an electron donor (B$_1$) to obtain a solid product (II), followed by subjecting said solid product (II) to a multi-stage polymerization treatment with a linear olefin and a non-linear olefin, each once or more times used, and further reacting the resulting linear olefin non-linear olefin block copolymer with an electron donor (B$_2$) and an electron acceptor,
  (2) an organoaluminum compound (A$_2$); and as a third component,
  (3) an aromatic carboxylic acid ester (E) or an organosilicon compound (S) having a Si—O—C bond and/or a mercapto group, and recovering a polypropylene having a melt flow rate (MFR) of 0.1 to 100 (g/10 min., 230° C., load 2.16 Kgf), an isotactic pentad ratio (P) of 0.975 to 0.990, a ratio of its weight average molecular weight to its number average molecular weight (Q) of 7 to 30 and a weight average molecular weight of 100,000 to 1,000,000.

10. A process according to claim 9 wherein a preactivated catalyst component obtained by combining said titanium trichloride composition (III) with an organoaluminum compound, followed by reacting an olefin with the resulting combination is used in place of said titanium trichloride composition (III).

* * * * *